United States Patent [19]
Hijikata et al.

[11] Patent Number: 5,566,545
[45] Date of Patent: Oct. 22, 1996

[54] PROCESS AND AN APPARATUS FOR TREATING AN EXHAUST GAS, AND A HONEYCOMB STRUCTURAL EXHAUST GAS FILTER

[75] Inventors: Toshihiko Hijikata, Nagoya; Tetsuya Hiraoka, Handa; Kazuhiko Umehara, Nagoya, all of Japan

[73] Assignee: NGK Insulators, Ltd., Japan

[21] Appl. No.: 288,033

[22] Filed: Aug. 10, 1994

[30] Foreign Application Priority Data

Aug. 10, 1993 [JP] Japan .................................. 5-198409
Aug. 10, 1993 [JP] Japan .................................. 5-198410

[51] Int. Cl.⁶ .................................................. F01N 3/02
[52] U.S. Cl. ...................... 60/274; 55/302; 55/DIG. 30; 60/311
[58] Field of Search ...................... 60/311, 274; 55/302, 55/DIG. 30

[56] References Cited

U.S. PATENT DOCUMENTS

| | | | |
|---|---|---|---|
| 4,833,883 | 5/1989 | Oda | 60/311 |
| 4,864,821 | 9/1989 | Hoch | 60/274 |
| 4,875,335 | 10/1989 | Arai | 60/311 |
| 5,253,476 | 10/1993 | Levendis | 60/311 |

FOREIGN PATENT DOCUMENTS 1-159408  6/1989  Japan .
4-86315   3/1992  Japan .

*Primary Examiner*—Douglas Hart
*Attorney, Agent, or Firm*—Parkhurst, Wendel & Burr, L.L.P.

[57] ABSTRACT

An exhaust gas-treating process by capturing particulates in exhaust gas discharged from an internal combustion engine with use of a honeycomb structural filter, the process including the steps of: (1) capturing the particulates contained in the exhaust gas by passing the exhaust gas through the filter; (2) stopping flow of the exhaust gas through the filter and transferring the captured particulates to a location remote from and outside an exhaust line by flowing the particulates captured by the filter in a direction reverse to a flowing direction of the exhaust gas; and (3) burning the particulates and discharging a burnt matter outside. The filter preferably has a honeycomb structural body and second sealed portions in first and second rows at opposite ends of the honeycomb structural body, respectively. Gas stream-introducing channels are each provided near and upstream of said first sealed portions in a respective one of said first rows and penetrating inner walls in the respective one of said first rows, while each of the gas stream-introducing channels penetrates an outer peripheral wall of the honeycomb structural body at at least one of opposite ends thereof.

25 Claims, 19 Drawing Sheets

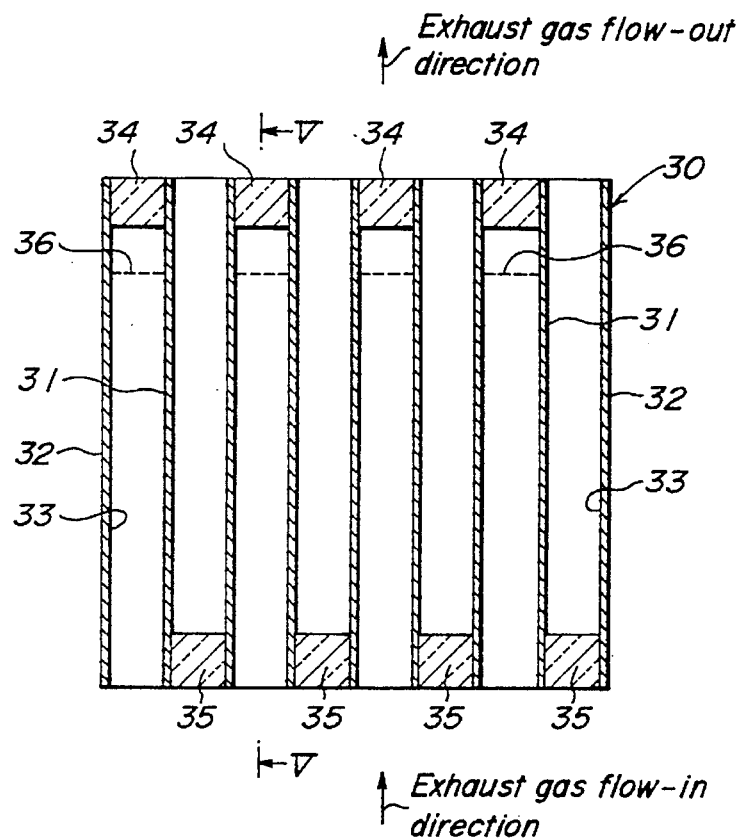
FIG_4
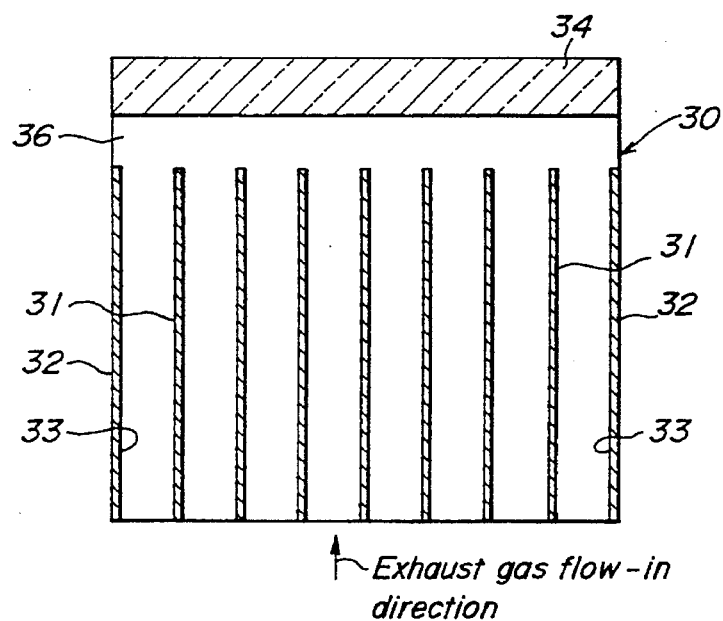
FIG_5

→ Exhaust gas
--→ Main pulse gas stream
—·→ Auxiliary pulse gas stream

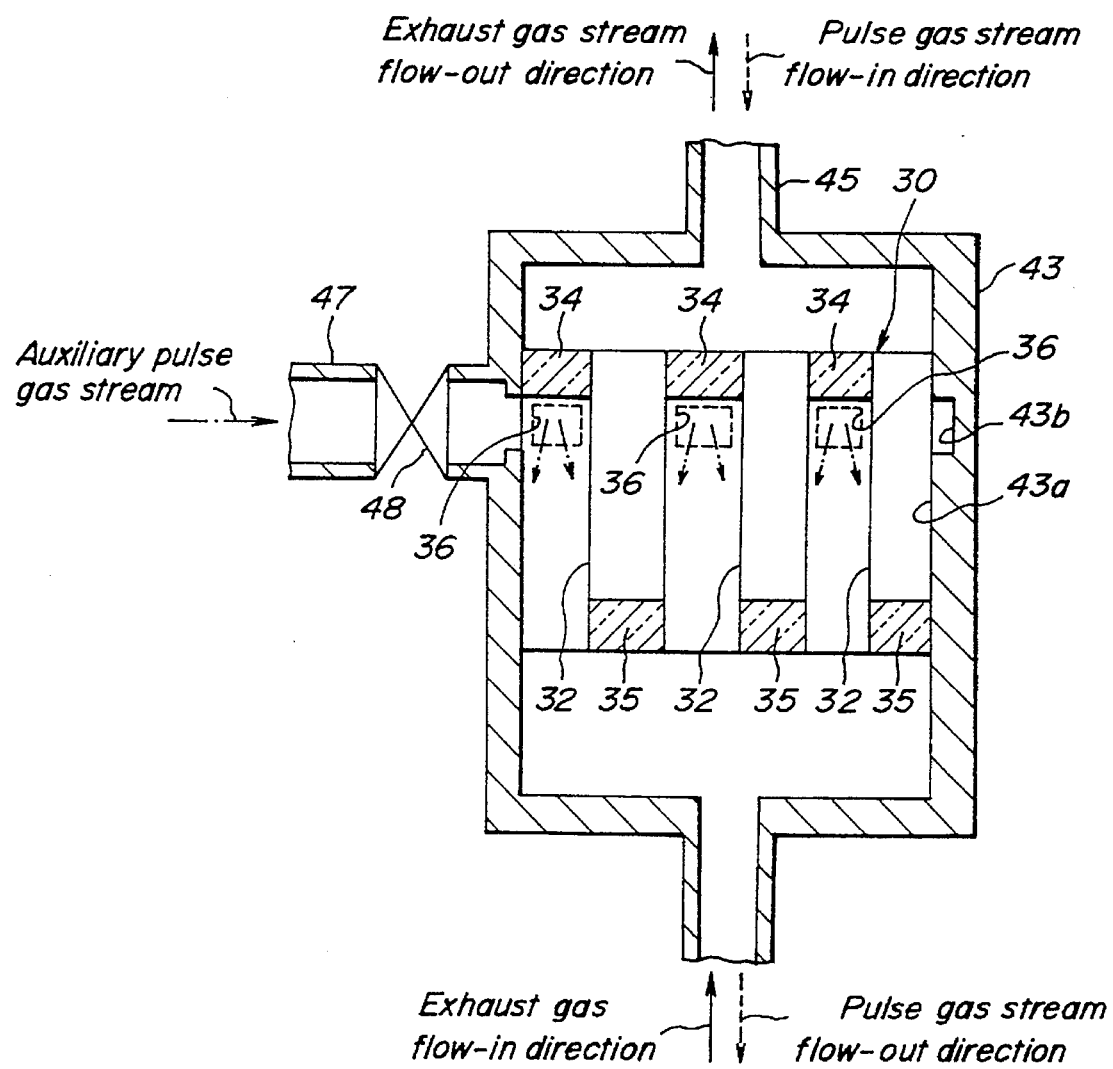
FIG_7

FIG_8A
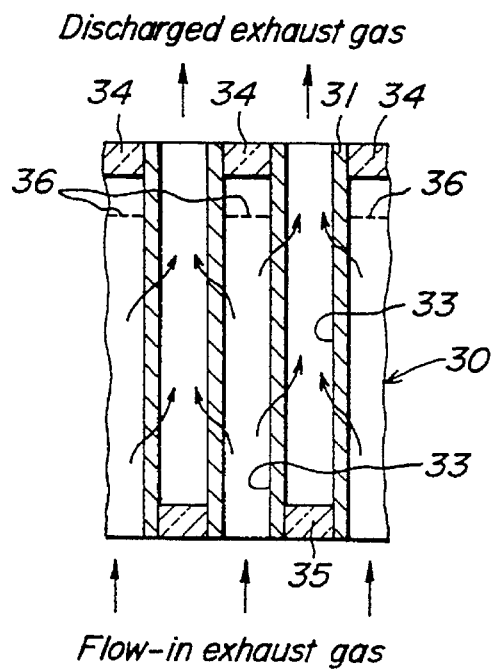
FIG_8B
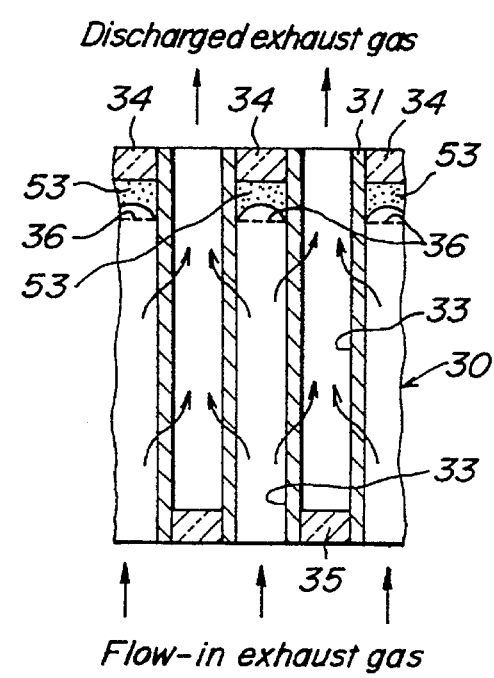
FIG_8C
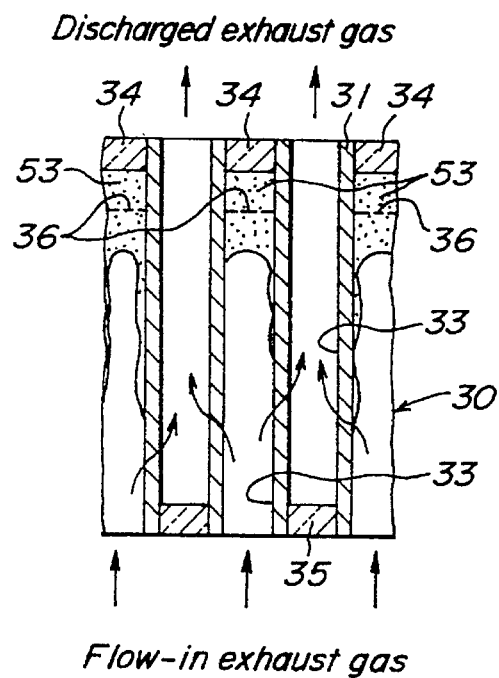

FIG_9
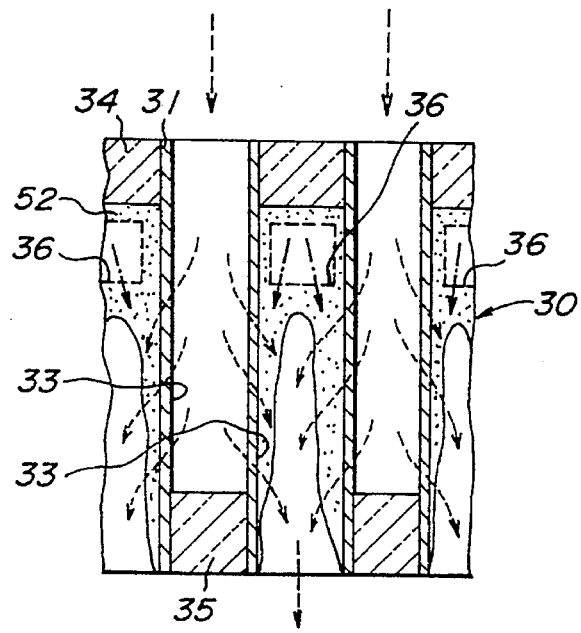
FIG_10
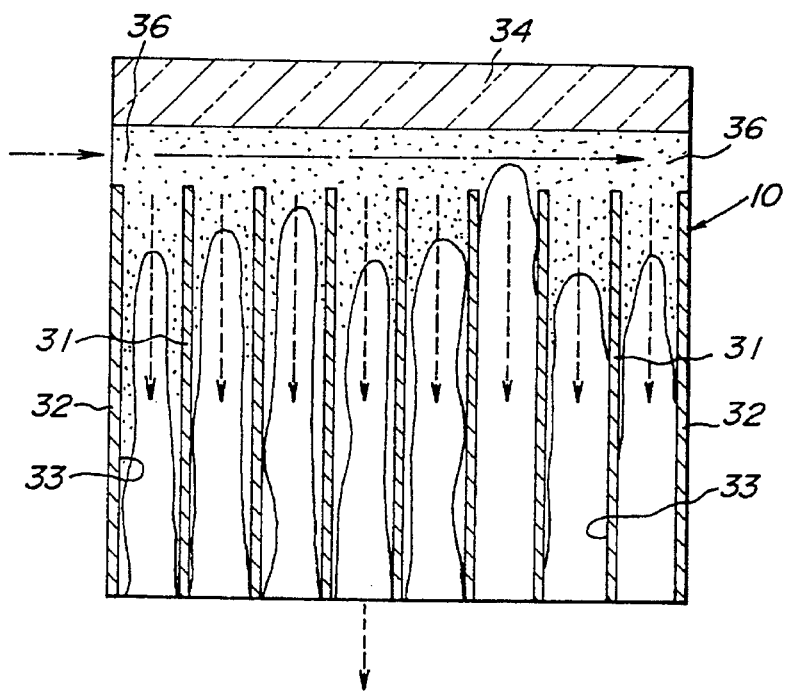

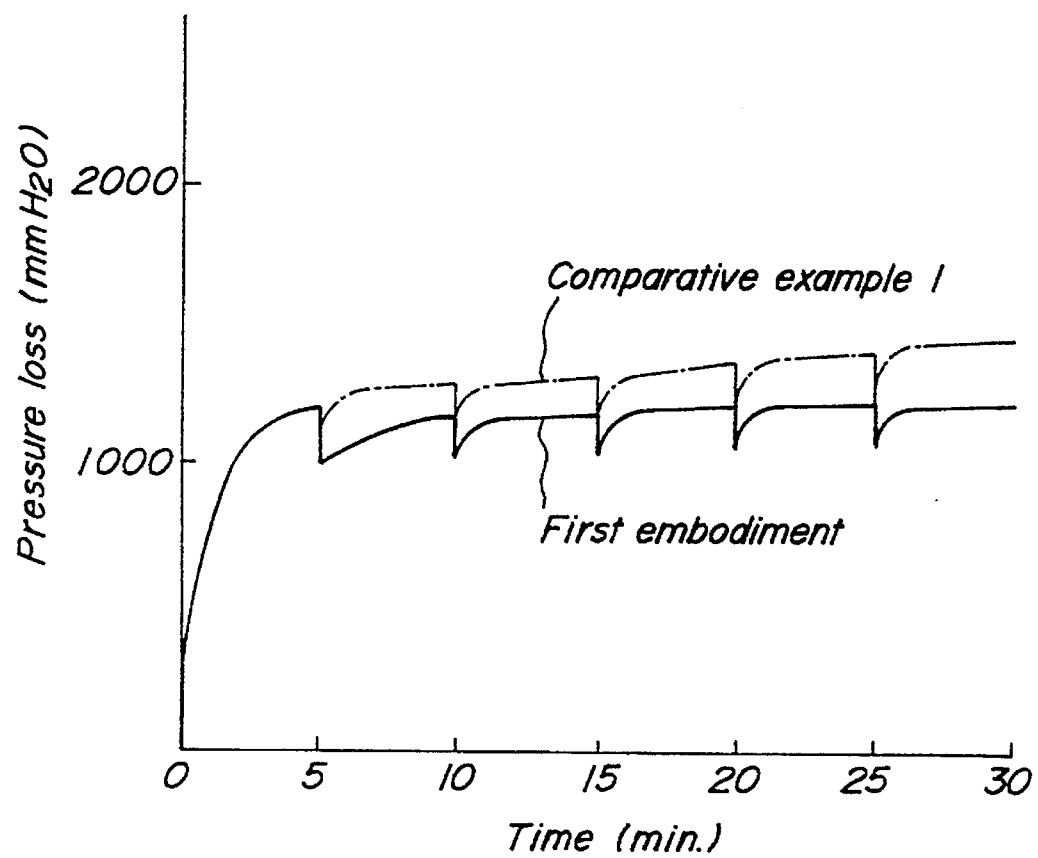
FIG_13

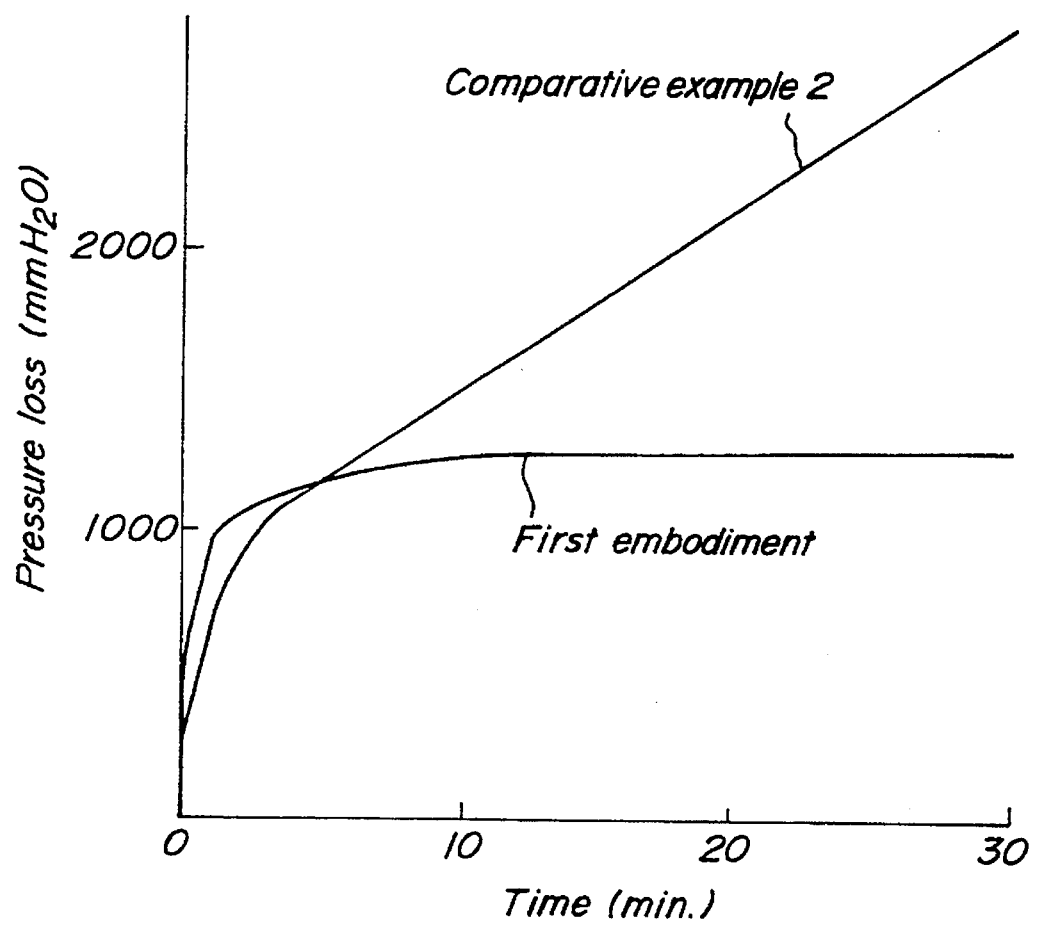
FIG_14

FIG_16A
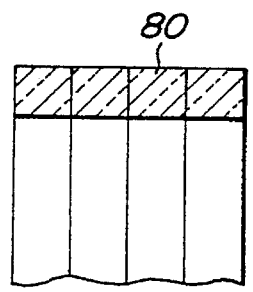
FIG_16B
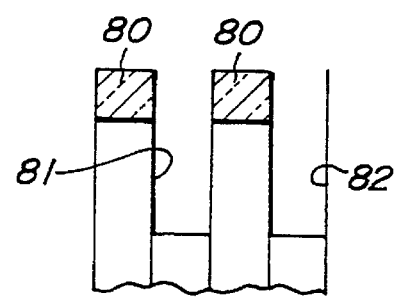
FIG_16C
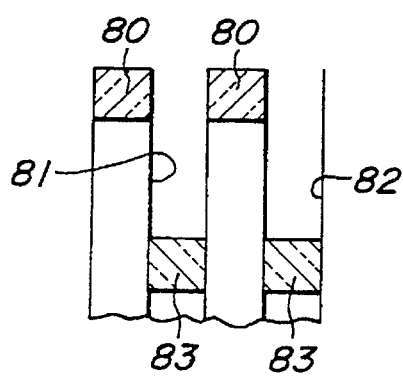
FIG_16D
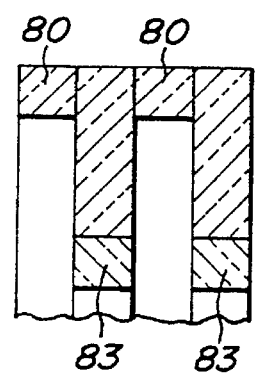
FIG_16E
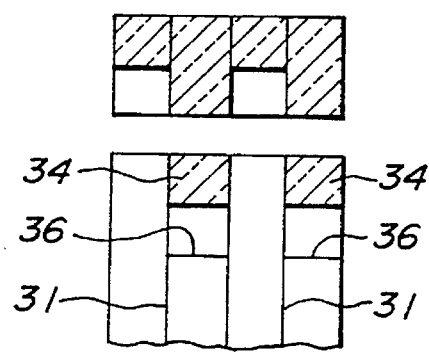

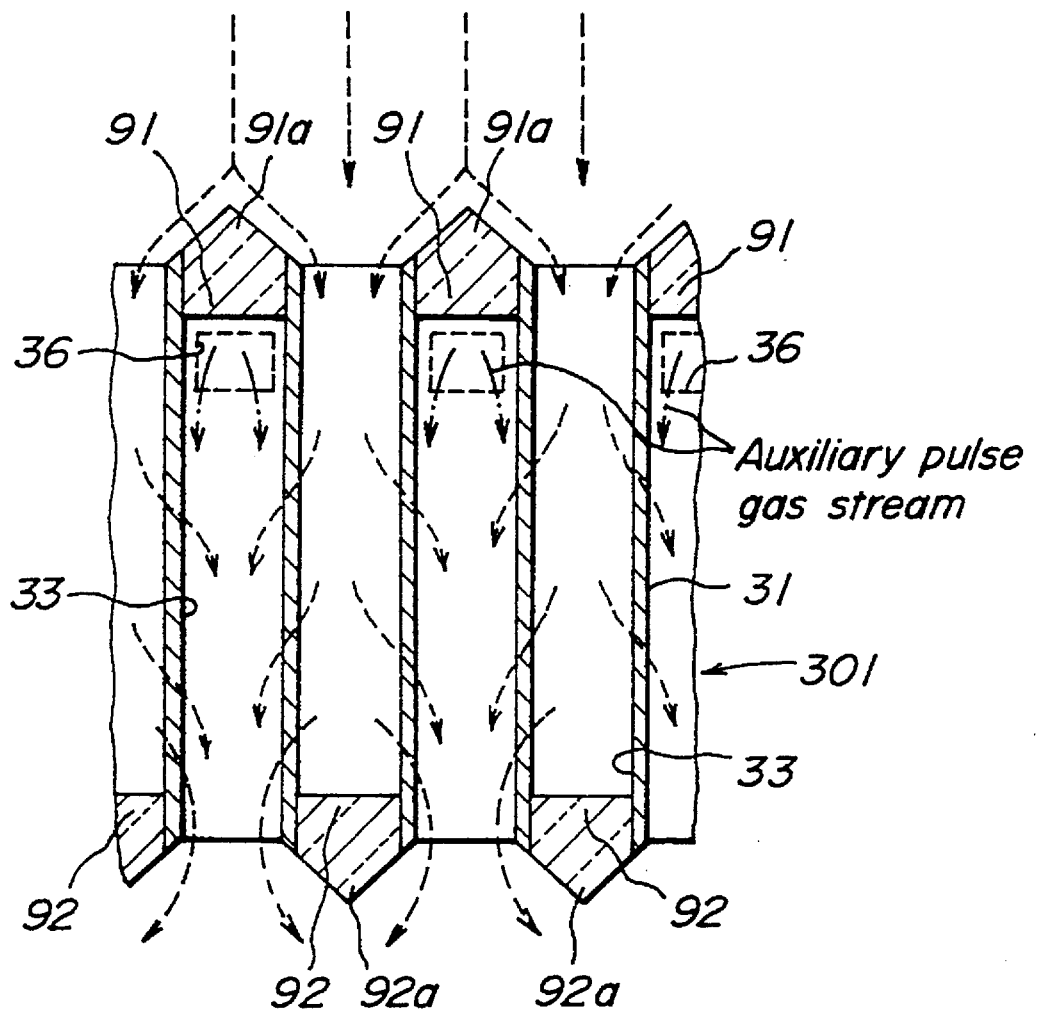
FIG_20

FIG_21
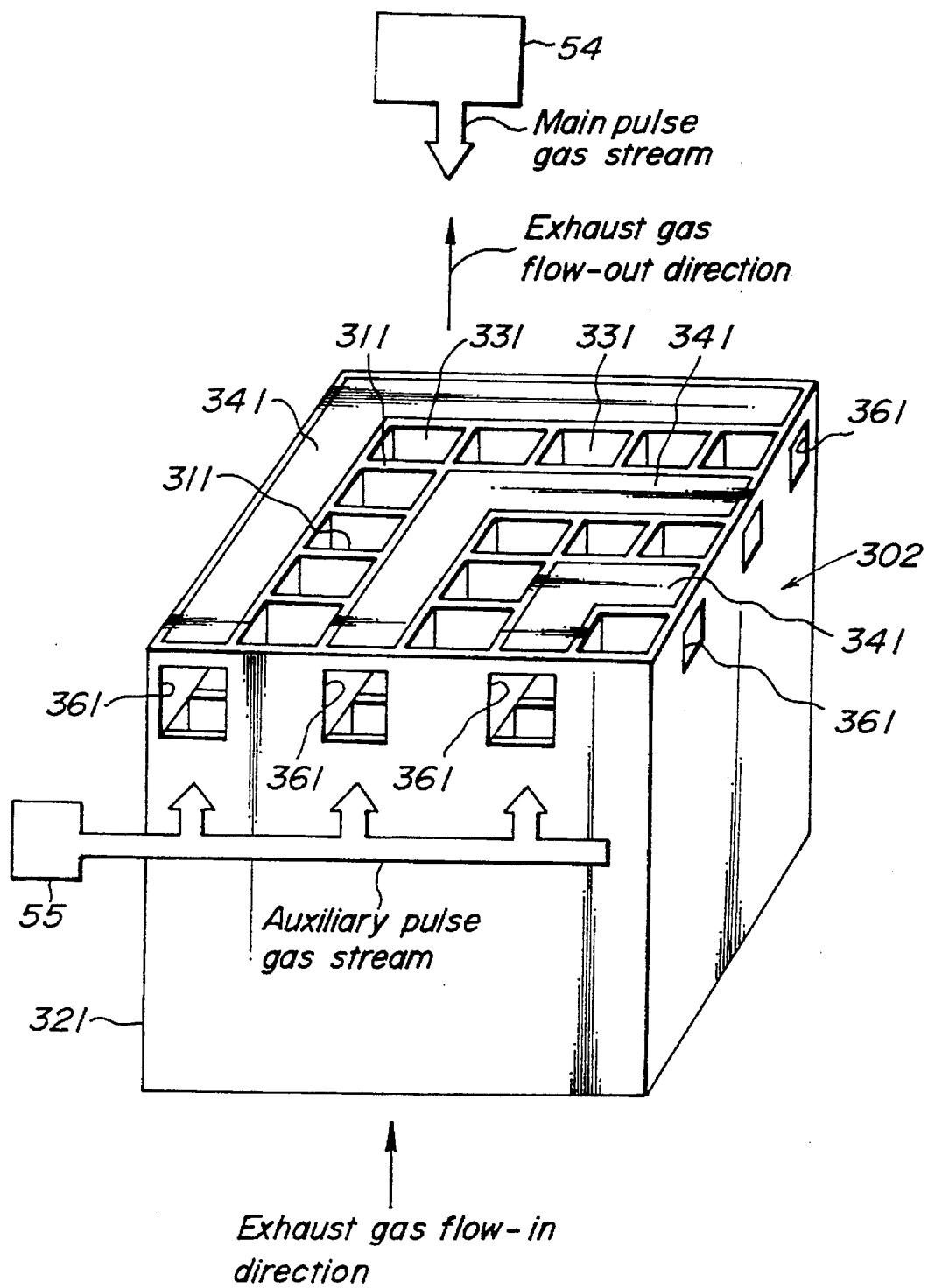

PROCESS AND AN APPARATUS FOR TREATING AN EXHAUST GAS, AND A HONEYCOMB STRUCTURAL EXHAUST GAS FILTER

BACKGROUND OF THE INVENTION (1) Field of the Invention

The present invention relates a process and an apparatus for treating an exhaust gas through capturing and disposing of particulates composed mainly of carbon in exhaust gases discharged from engines such as diesel engines, and also to a honeycomb structural exhaust gas filters adapted to capture such particles and allow them to be removed with a gas stream that flows in a direction reverse to that of the exhaust gas flow.

(2) Related Art Statement

Particulates composed mainly of carbon are contained at a high concentration in exhaust gases from the diesel engines, which causes pollution. Various proposals have been made on exhaust gas filters to capture and remove such particulates in the exhaust gases.

For example, according to unexamined Japanese patent application Laid-open No. 1-159,408 discloses a technique in which carbonaceous particulates are captured by a honeycomb structural filter, the captured particulates are removed from inner walls of the filter with a back-washing gas stream intermittently flown in a direction reverse to that of passing the exhaust gas through the filter, and the removed particulates are burnt in a recapturing section provided inside the exhaust gas flow passage upstream near the filter. In the above honeycomb structural filter, given gas flow holes are closed at one end of the honeycomb structure, and the remaining gas flow holes are closed at the other end.

However, there is a fear that since the recapturing section is provided in the exhaust gas flow passage under or near the filter, the particulates peeled by back wash gas stream are blown back to the filter again without being caught in the recapturing section.

Further, in such a conventional honeycomb structural filter as the exhaust gas filter, when particulates caught by the exhaust gas filter are to be peeled off with a back wash gas stream, the back wash gas stream is difficult to flow near the sealed portions of the gas flow holes on the upstream side of the back wash gas stream. Consequently, the particulates heaped in the filter are not fully peeled off and partially remain. Thus, the exhaust gas filter is not fully regenerated, which causes increase in the pressure loss of the filter.

Summary of the Invention

The present invention has been accomplished to solve the above-mentioned problems, and is aimed at the provision of a process and an apparatus in which particulates contained in exhaust gases are captured in a primary capturing means, and the captured particulates are transferred to a secondary capturing means which is located outside an exhaust line and remote from the primary capturing means and in which the particulates are disposed.

Further, the present invention is aimed at the provision of an exhaust gas honeycomb filter of which excellent function to capture particulates can be maintained without increasing the pressure loss of exhaust gas through the filter by peeling off the particulates mainly composed of carbon and heaped in the exhaust gas filter with a gas stream blown into the exhaust gas filter and regenerating the filter.

The exhaust gas-treating process according to a first aspect of the present invention by capturing particulates in exhaust gas discharged from an internal combustion engine with use of a honeycomb structural filter, includes the steps of: (1) capturing the particulates contained in the exhaust gas by passing the exhaust gases through the honeycomb structural filter; (2) stopping flow of the exhaust gas through the filter and transferring the captured particulates in a remote location and outside an exhaust line by flowing the particulates captured by the filter in a direction reverse to a flowing direction of the exhaust gas; and (3) burning the particulates and discharging a burnt matter outside. The term "remote location" means such a location remote from and outsides the exhaust line that substantially no peeled particulate may be blown back to the filter again.

In this exhaust gas-treating process, the second and third steps may be carried out periodically or non-periodically during operating the internal combustion engine.

The exhaust gas-treating process according to a second aspect of the present invention for capturing and disposing of particulates contained in exhaust gas from an internal combusting engine, includes the steps of: (1) capturing the particulates contained in the exhaust gas by flowing the exhaust gases through a filter; (2) removing the captured particulates from the filter and regenerating the filter by flowing air through the filter in a direction reverse to a flowing direction of the exhaust gas; (3) transferring the captured particulates to a location remote from and outside an exhaust line of the filter with use of pressure of said air; and (4) burning the particulates at said remote location and discharging a burnt matter outside.

The exhaust gas-treating apparatus according to a third aspect of the present invention for capturing and disposing fine of particulates discharged from the internal combustion engine, includes (1) a honeycomb filter for capturing the particulates in a filter by flowing the exhaust gases through the filter; (2) a unit arranged and remote from outside an exhaust gas line and adapted for burning the captured particulates; (3) a shut valve arranged at an exhaust gas-inlet side of the filter; (4) a pipe line connected to an inlet side of the shut valve and the burning unit at opposite ends, respectively; (5) and an air feeder for feeding air into the filter in a back flow direction reverse to a flowing direction of the exhaust gases and leading the particulates to the burning unit through the shut valve and the pipe line, when the shut valve shuts an exhaust gas line.

The exhaust gas-treating apparatus according to the third aspect of the present invention may further include (1) a secondary filter for capturing the particulates contained in a first pulse air, a second pulse air-feeding means for flowing a secondary pulse air into the secondary filter in a back-wash direction reverse to the flowing direction of the primary pulse air and removing the particulates captured in the secondary filter, a vessel for receiving the captured particulates removed from the secondary filter, and means provided in the vessel and adapted for burning the captured particulates.

The exhaust gas honeycomb filter according to a fourth aspect of the present invention includes a honeycomb structural body having a number of gas flow holes through which the exhaust gas passes; a first sealed section sealing exhaust gas-downstream ends of such gas flow holes that are located in given first rows; second sealed portions sealing exhaust gas upstream ends of the remaining gas flow holes that are located in the remaining second rows; and gas stream-introducing channels each provided near and on an upstream side of said first sealed portions in a respective one of said first rows and penetrating inner walls in the respective one of said first rows, while each of the gas stream-introducing channels penetrates an outer peripheral wall of the honeycomb structural body at at least one of opposite ends thereof.

The exhaust gas honeycomb filter according to the fourth aspect of the present invention preferably further includes a first gas stream generator for generating a gas stream to flow into the honeycomb structural body from a downstream side of the exhaust gas flow, and a second gas stream generator for generating a gas stream to flow into the gas stream-introducing holes from the outer peripheral side of the outer wall of the honeycomb structural body.

The exhaust gas honeycomb gas filter according to the fourth aspect of the present invention may be favorably employed as the filter in the first through third aspects of the present invention.

According to the first through third aspects of the present invention, since the captured particulates are transferred to the location outside the exhaust system and remote from the filter and burnt there and the burnt matter is discharged outside, the particulates are not returned to the particulate-capturing the filter.

Further, the exhaust gas discharged from the internal combustion engine such as a diesel engine enters the primary capturing means such as the holes of primary filter, passes through the porous walls partitioning the holes, and is discharged outside through the primary filter. At that time, the particulates in the exhaust gas are captured by the porous walls on the inlet side, and the heaped amount of the particulates increases with increase in the flow amount of the exhaust gas.

Then, the flow of the exhaust gas is stopped, air such as pulse air is flowed through the primary filter in a direction reverse to the then flowing direction of the exhaust gas. Consequently, the heaped particulates are blown toward the exhaust gas inlet side of the primary filter, and recovered in the secondary capturing means such as the secondary filter through the pipe line.

Then, the particulates captured in the secondary capturing means are disposed of and the burnt matter is discharged outside.

According to the third aspect of the present invention, the particulates captured in the primary filter are recovered in the secondary filter at the remote location through the pipe line and then disposed of there. Therefore, the particulates captured by the primary filter are assuredly transferred to the remote location and then disposed there, so that the particulates are prevented from flowing back to the primary filter. By so doing, the dust-collecting function and regenerating function of the primary filter can be synergistically largely improved.

According to the fourth aspect of the present invention, the honeycomb structural body is used as the exhaust gas filter, the first sealed section is formed at end portions of the gas flow holes in each of the first given first rows on the exhaust gas-downstream side, the second sealed section is formed in end portions of the gas flow holes in the remaining rows on the exhaust gas-upstream side, and gas stream-introducing channels each provided near an upstream side of the sealed portions of the first sealed section in the respective one of said first rows and penetrating inner walls in the respective one of said first rows, while each of the gas stream-introducing channels penetrates an outer peripheral wall of the honeycomb structural body at at least one of opposite ends thereof. Therefore, the particulates heaped near the first sealed section can be excellently peeled off by ejecting the gas stream into the gas stream-introducing holes from the outer wall of the exhaust gas filter.

These and other objects, features and advantages of the invention will be appreciated when taken in conjunction with the attached drawings, with the understanding that the invention could be made by the person skilled in the art to which the invention pertains.

BRIEF DESCRIPTION OF THE DRAWINGS

For a better understanding of the invention, reference is made to the attached drawings, wherein:

FIG. 4 is a sectional view of FIG. 3 along a line IV—IV:

FIG. 5 is a sectional view of FIG. 4 along a line V—V:

FIG. 7 is a schematically enlarged view of a portion of the exhaust gas-treating apparatus inside a circle VII;

FIGS. 8(A) through 8(C) are sectional views schematically illustrating how the particulates in the exhaust gas are heaped in the gas flow holes of the exhaust gas filter as the second embodiment of the present invention in FIG. 3;

FIG. 9 is a sectional view for schematically illustrating a main pulse gas flow and an auxiliary pulse gas flow in the exhaust gas filter as the second embodiment of FIG. 4;

FIG. 10 is a sectional view for schematically illustrating flows of a main pulse gas stream and an auxiliary pulse gas stream in the exhaust gas filter of FIG. 5 as a the second embodiment of the present invention;

FIG. 13 is a graph showing the relationship between the pressure loss and the time with respect to the first embodiment of the present invention and Comparative Example 1

FIG. 14 is a graph showing the relationship between the pressure loss and the time with respect to the first embodiment of the present invention and Comparative Example 2

FIGS. 16(A) through 16(E) are views for schematically illustrating a example of the process for producing a first sealed section of the second embodiment of the present invention;

FIG. 20 is a schematic sectional view of a part of an exhaust gas filter as a fourth embodiment of the present invention; and FIG. 21 is a perspective view of an exhaust gas filter as a fifth embodiment of the present invention.

DETAILED DESCRIPTION OF THE INVENTION

In the following, embodiments of the present invention will be explained with reference to the attached drawings.

Figure 1:
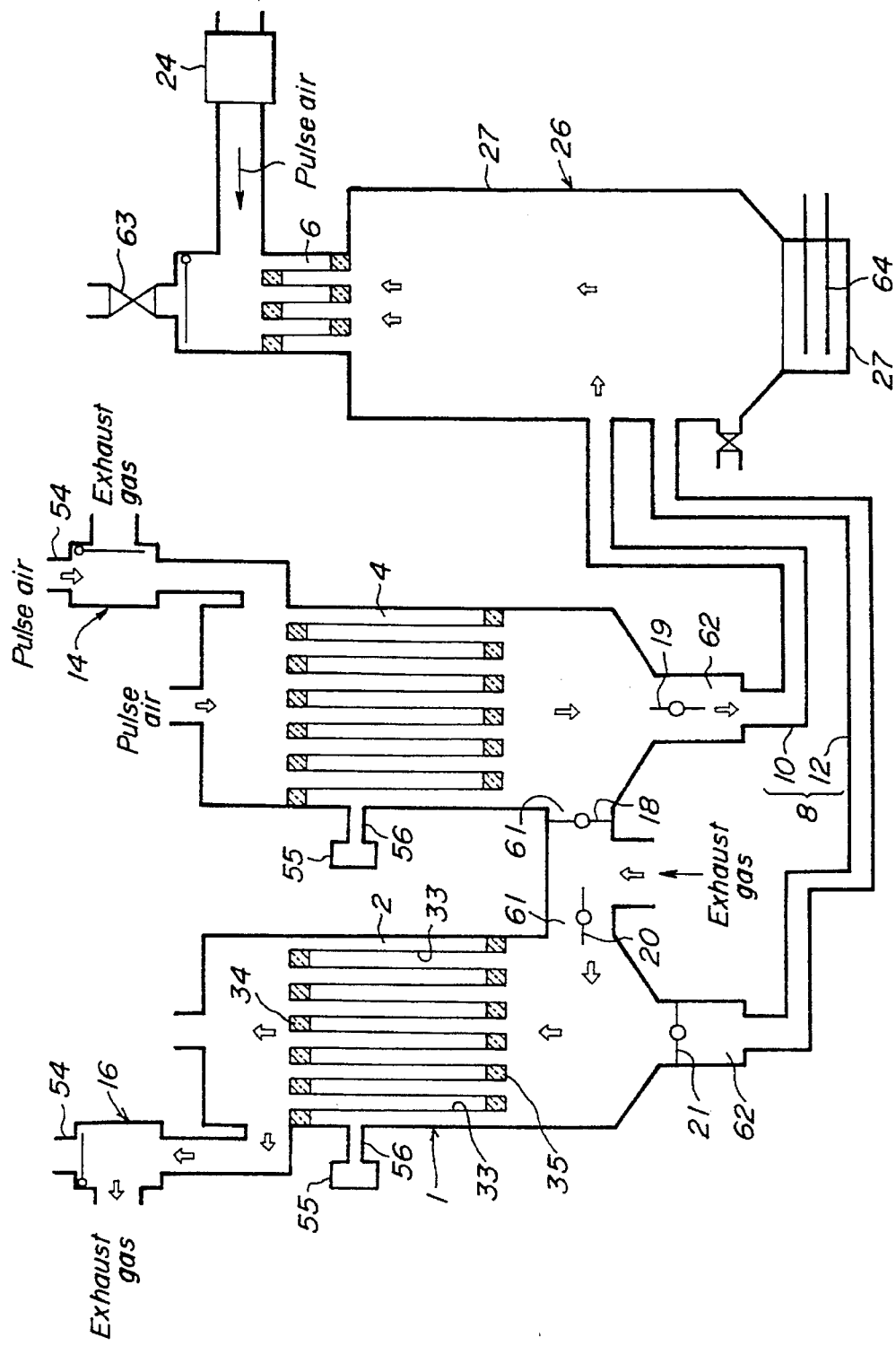
FIG. 1 is a view illustrating an outlined construction of an exhaust gas-treating apparatus according a first embodiment of the present invention.
Figure 2:
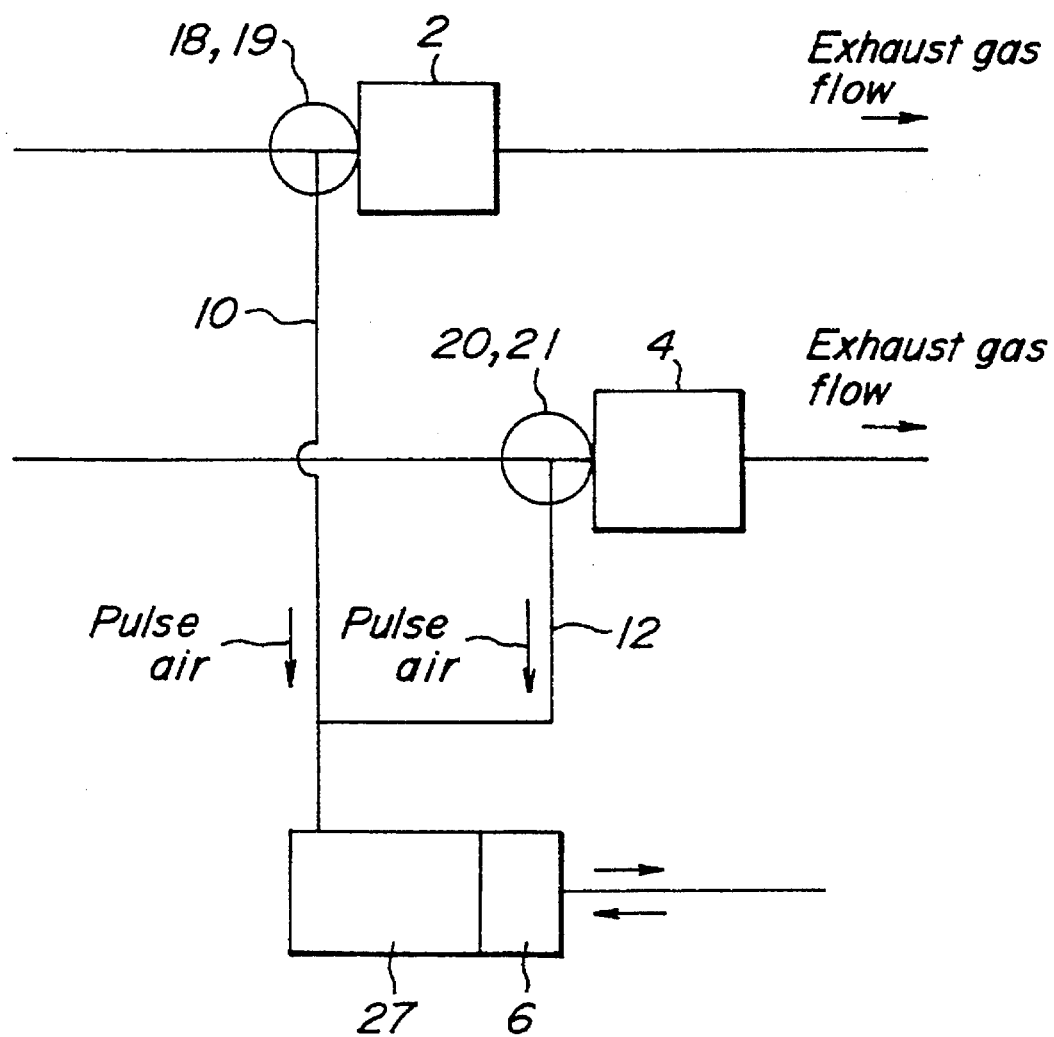
FIG. 2 is a circuit diagram showing flow paths and pulse flow paths in the first embodiment of the present invention.

First, an exhaust gas-treating apparatus as a first embodiment is shown in FIGS. 1 and 2.

As shown in FIG. 1, the exhaust gas-treating apparatus 1 includes (1) primary filters 2, 4, (2) a secondary filter 6, (3) a pipe line unit 8 (pipe lines 10, 12), (4) primary air feeders 14, 16, (5) switch valves 18, 19, 20, 21, (6) a secondary air feeder 24, and (7) a treating unit 26.

As shown in FIG. 1, the primary filters 2 and 4 are arranged such that exhaust gases from a diesel engine may flow into selectively either one of or both of the primary filters 2, 4. That is, the primary filters 2, 4 are arranged such that the exhaust gas from the engine is passed upwardly through the primary filters 2, 4 through the switch valves 18 and 20, respectively. FIG. 2 is a circuit diagram showing flow paths and pulse flow paths in the first embodiment of the present invention.

Figure 3:
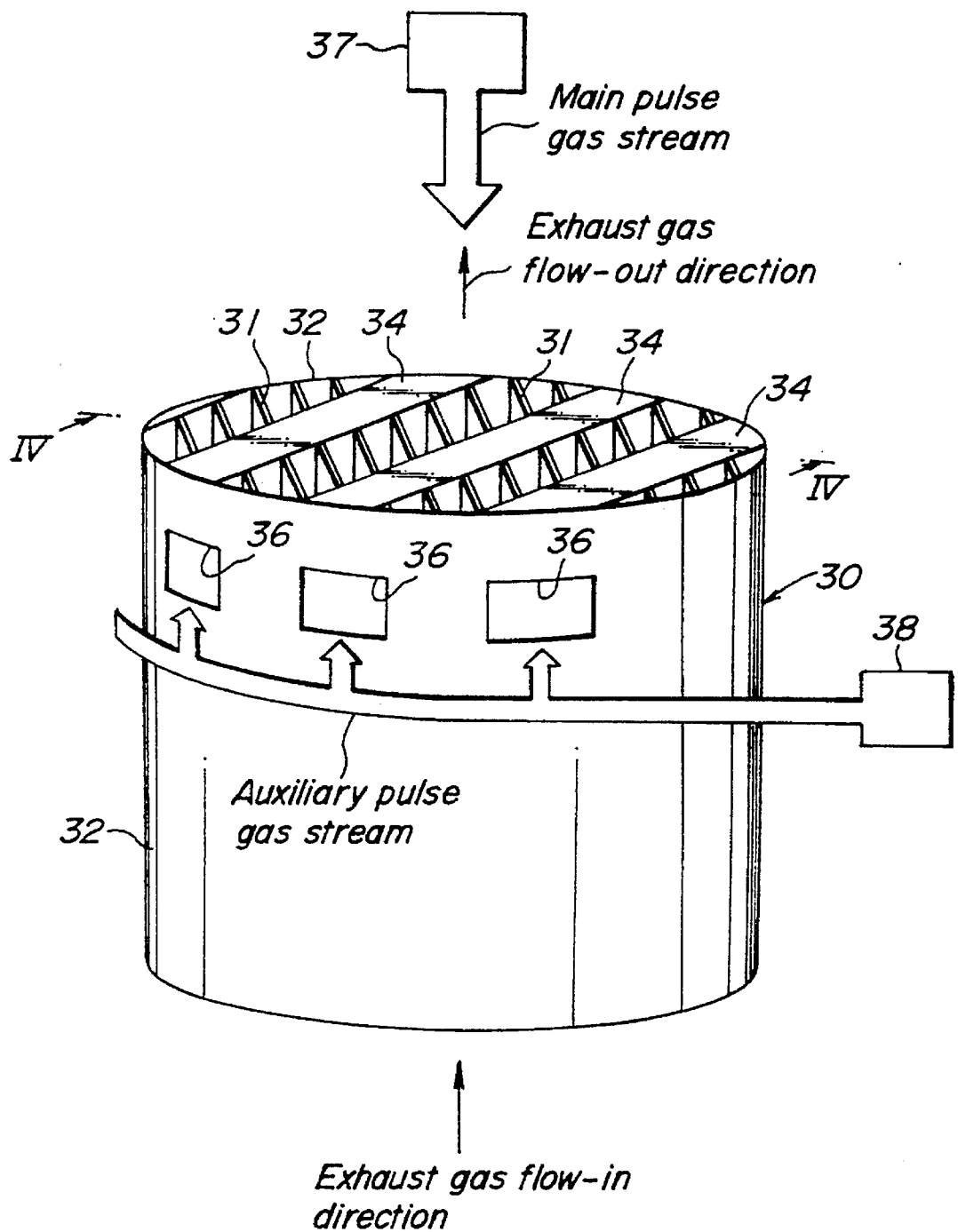
FIG. 3 is a perspective view for illustrating an exhaust gas filter in a second embodiment of the present invention.

As the primary filters 2, 4, an exhaust gas filter 30 shown in FIGS. 3 through 5 may be used. This exhaust gas filter 30 is constituted by a cylindrical honeycomb structural body made of, for example, porous cordierite. The exhaust gas filter 30 includes inner walls 31, and an outer peripheral wall 32. In the filter 30, a number of through holes 33 are defined extending in a z-direction by the inner walls 31 crossing in x- and y-directions and the outer peripheral wall 32. The through holes 33 arranged in each of given lines are sealed with a first sealed portion 34 at an exhaust gas outlet side of the filter, and the through holes 32 arranged in each of the remaining lines are sealed with a second sealed portion 35 at an exhaust gas inlet side. The first sealed portions 34 and the second sealed portions 35 are preferably arranged in parallel to one another and alternatively provided as viewed in a direction orthogonal to a direction along which the first and second sealed portions extend. An auxiliary pulse gas stream channel 36 is provided near and upstream the first sealed portion 34 of the through holes 33 arranged in each of the lines, and penetrate the inner walls 31 partitioning these through holes 33. The channel 36 penetrates the outer peripheral wall 32 is at at least one of the opposite ends thereof. The exhaust gas filter 30 is equipped with a compressor 37 for ejecting a main pulse gas stream and a compressor 38 for ejecting an auxiliary pulse gas stream as schematically shown in FIG. 3.

In this embodiment, the first sealed portions 34 are formed at a given thickness in the exhaust gas filter 30 at the downstream end of the exhaust gas stream such that the first sealing portions are located in one linearly straight row. The second sealed portions 35 are formed at a given thickness in the exhaust gas filter at the upstream side of the exhaust gas stream such that the second sealed portions are located in a linearly straight row other than those with the first sealed portions 34.

As shown in FIG. 5, the gas stream-introducing channel 36 is formed by removing the inner walls 31 and outer peripheral walls 32 near the sealed portion 34 in the through holes 33 in the sealed line, transversely penetrating the gas filter 30. Since the gas stream-introducing channel 36 has a blow-in opening, the outer peripheral wall at one end of the gas stream-introducing hole 36 need not be removed.

As the compressors 37 and/or 38, an existing compressor mounded on a vehicle may be commonly used or another or other compressors may be used exclusively thereas.

Figure 6:
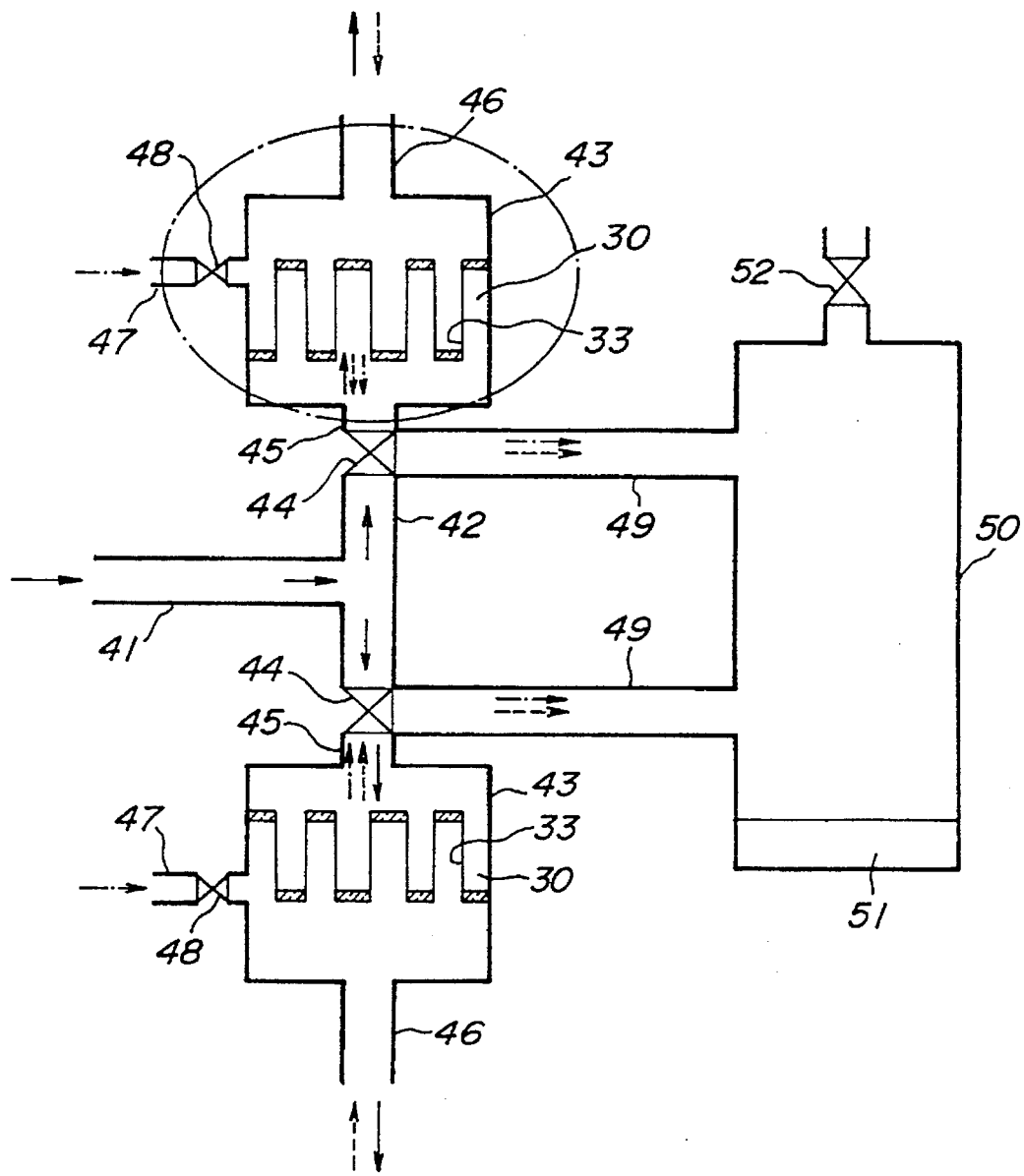
FIG. 6 is a view schematically illustrating the construction of an exhaust gas-treating apparatus to which the exhaust gas filter as the second embodiment in FIG. 3 is employed.

FIGS. 6 and 7 show another exhaust gas-treating apparatus to which the exhaust gas filters 30 in the second embodiment of the present invention are applied.

In this apparatus, branched flow pipes 42 are connected to an exhaust gas pipe 41 into which the exhaust gas flows, and the exhaust gas is led to a pair of the filtering tubes 43 through the branched flow pipes 32. A switch valve 44 is arranged at an exhaust gas inflow opening 45 of the filtering tube 43 so that switching may be effected by the switch valve 44 between the flow of the exhaust gas and the flow of a pulse gas. The filtering tubes 43 may be oriented in any direction depending upon the size of an allowable installation space.

The gas filter 30 is placed in the filtering tube 43 such that the through holes 33 may be in parallel to the flowing direction of the exhaust gas. A gas gateway 46 is provided at an end face of the filtering tube 43 on the opposite side of the exhaust gas inflow opening 45. The filtering tube 43 is provided with an auxiliary pulse gas inflow pipe 47 at a location of the peripheral wall corresponding to a given auxiliary gas stream-introducing channel 36. A valve 48 is arranged at an inflow opening of the auxiliary pulse gas inflow pipe 47 to the filtering tube 43. As shown in FIG. 7, a channel 43b having a U-shaped section is provided in an inner wall 43a of the filtering tube 43 at a location corresponding to the auxiliary pulse gas stream-introducing channel 36.

As shown in FIG. 6, a transfer pipe 49 extends from the switch valve 44, and is connected to a recapturing tube 50. The recapturing tube 50 includes a heating section 51 in a bottom portion in an inner wall on a perpendicularly downward side, and a gas-escape valve 52 on the opposite side of the heating section 51.

In the following, explanation will be made of (1) the exhaust gas-flowing course, (2) the main pulse gas-flowing course, (3) the auxiliary pulse gas-flowing course, and (4) treatment of the recaptured particulates.

(1) Exhaust Gas-Flowing Course

The exhaust gas flowing into the exhaust gas inflow pipe 41 is led to the gas inflow opening of each of the filtering tubes 43 through the branched flow pipe 42. When the particulates are to be captured, the switch valve 44 arranged at the gas inflow opening 45 communicates the branched pipe 42 with the filtering tube 43 so that the exhaust gas may flow into the filtering tube 43 through the switch valve 44. The particulates composed mainly of carbon in the exhaust gas are captured in fine pores formed in the inner walls of the exhaust gas filter 30, and the exhaust gas not containing the particulates passes the fine pores of the inner walls, and is discharged outside through the gas gateway 46. The valve 48 arranged in the auxiliary pulse gas inflow pipe 47 is to prevent the exhaust gas from entering the auxiliary pulse gas pipe 47 when the particulates are to be captured.

(2) Main Pulse Gas-Flowing Course

The main pulse gas stream is ejected into one of two filtering tubes 43 through the compressor for around 0.1 second, and 2 to 10 seconds after this ejection, the main pulse gas stream is ejected into the other filtering tube 43. The switch valve 44 on the side of the filtering tube 43 into which the main pulse gas stream is to be ejected communicates the recapturing tube 50 with the transfer pipe 49 extending from the switch valve 41. The main pulse gas stream ejected into the filtering tube 33 peels off, from the filter 30, the particulates captured by the inner walls of the exhaust gas filter 30, thereby restoring the particulate-capturing power of the exhaust gas filter 30. The peeled particulates are transferred to the recapturing tube 50 through the transfer tube 49 under the ejecting pressure of the main pulse gas stream. The switch valve 44 on the side of the filtering tube 43 into which the main pulse gas stream is not ejected connects the branched pipe 42 with the filtering tube 43, thereby flowing the exhaust gas into the filtering tube 43. The particulates are captured by the exhaust gas filter 30 placed in this filtering tube 43. The main pulse gas stream is alternatively and periodically ejected to two filtering tubes 43 at an interval of around 3 minutes. The ejection of the main pulse gas stream and the discharging of the exhaust gas at the gas gateway 46 are controlled by a switch valve not shown.

(3) Auxiliary Gas Stream-Flowing Course

The auxiliary gas stream is ejected alternatively into the filtering tubes 43 through the compressor 26 in synchronization with the main pulse gas stream. At that time, the valve 48 communicates the auxiliary pulse gas stream inflow pipe 47 with the filtering pipe 43. The auxiliary pulse gas stream ejected into the filtering pipe 43 enters the channel 43b formed in the inner wall 43a of the filtering tube 43, and enters the auxiliary gas stream-introducing channels 36 through the channel 33b. Consequently, the auxiliary pulse gas stream peels off the particulates heaped on the inner walls of the gas flow holes 36. The peeled particulates are collected in the recapturing tube 50 through the transfer pipe 49 under the total ejecting pressure of the auxiliary pulse gas stream and the main pulse gas stream.

The auxiliary pulse gas stream and the main pulse gas stream may be ejected periodically or non-periodically. If the ejecting time period for the auxiliary gas stream does not overlap with that for the main pulse gas stream, the peeled particulates are led to the recapturing tube 38 under the ejecting pressure of the auxiliary pulse gas stream or the main pulse gas stream.

(4) Treatment of the Captured Particulates

The particulates gathered in the recapturing tube 50 gravitationally drop and heap onto the heating section 51, and burn off under heating with the heater 50. The value 52 functions for air escaping or an air introduction.

Next, how the particulates in the exhaust gas are heaped in the exhaust gas filter, and the function of the main pulse gas stream and the auxiliary pulse gas stream to peel the particulates will be explained with reference to FIGS. 8(A) through 8(C), FIG. 9 and FIG. 10.

As shown in FIG. 8(A), the exhaust gas flows into the gas flow holes 36 formed with the first sealed portions 34 from the side where no first sealed portions are provided, and then into the gas flow holes 34 formed with the second sealed portions 34 through the fine pores present in the inner walls 31. The exhaust gas is discharged through the gas flow holes 33 formed with the second sealed portions at ends not formed with the sealed portions. At that time, since the particulates composed mainly of carbon and contained in the exhaust gas are caught by the fine pores of the inner walls 31 and cannot pass the inner walls 31, the particulates are not discharged through the waste gas filter 30.

As shown in FIGS. 8(B) and 8(C), the particulates 53 begin heaping immediately under the first sealed portions 34, and continue heaping toward the exhaust gas upstream side while filling the gas flow holes 33. As time lapses, the inner walls 31 are covered with the particulates 53, and the fine pores of the inner walls 31 are clogged therewith. Accordingly, the pressure loss of the exhaust gas passing the exhaust gas filter 30 increases, and the efficiency to remove the particulates from the exhaust gas decreases. Thus, it is necessary to remove the particulates heaped at a given time interval.

As shown in FIGS. 9 and 10, since the first sealed portions are arranged on the main pulse gas stream-ejecting side, the main pulse gas stream cannot directly enter portions of the gas flow holes heaped with the particulates 53. Therefore, the main pulse gas stream enters the gas flow holes 33 with the second sealed portions 34, passes the fine pores of the inner walls 31, and enters the gas flow holes 33 with the first sealed portions. The main pulse flowing in peels the particulates heaped on the inner walls 31, and the peeled particulates are transferred to the recapturing tube under the pressure of the main pulse gas stream.

However, the main pulse gas stream enters in parallel into the gas flow holes 12 with the second sealed portions 35, and then, through the fine pores of the inner walls 31, into the gas flow holes 33 in which the particulates are heaped. Accordingly, it is difficult for the main pulse gas stream to enter near the first sealed portions 34, so that the particulates 53 remain near the first sealed portions 34 at which the particulates are most heaped.

Thus, the auxiliary pulse gas stream is ejected into the auxiliary pulse gas-introducing channels 36 located near the first sealed portions 34 from the outer side of the outer peripheral wall 32 which the gas-introducing channels penetrate. Since the auxiliary pulse gas-introducing channel 23 penetrates the inner walls 31 near the first sealed portion 34 arranged in the same line on the upstream side of the exhaust gas, the particulates 53 heaped near the first sealed portion 34 of the gas flow holes 33 in the same row is peeled from the inner walls 31 under the ejecting pressure of the auxiliary pulse gas stream. The peeled particulates are transferred, under the total ejecting pressure of the auxiliary pulse gas stream and the main pulse gas stream, to the recapturing tube together with the particulates peeled under the ejecting pressure of the main pulse gas stream.

As mentioned above, the auxiliary pulse gas stream and the main pulse gas stream may be periodically or non-periodically ejected. If the time period for the former gas stream does not overlap with that for the gas stream, the peeled particulates are transferred to the recapturing tube under the ejecting pressure of either of them.

As schematically shown in FIG. 1, the secondary filter 6 is of a honeycomb structural body in which a part of numerous through holes 30 are sealed on one end side, and the remaining through holes not sealed on said one end side are sealed on the other end side. As is the same with the above-mentioned primary filters 2 and 4, one end of each of the through holes is closed on said one end side, and the other end is closed on said other end side. Whereas one end of each of the through holes is opened on said one end side, and the other end is closed on said other end side. (3) The pipe line unit 8 includes pipe lines 10, 12 which connect the inlet sides of the primary filters 2, 4 with the inlet side of the secondary filter 6, respectively. The particulates can be transferred from the primary filters 2, 4 to the secondary filter 6 located at a location outsides and remote from the exhaust line through the pipe lines 10, 12, respectively. (4) The primary filters 2, 4 are provided, on the outflow side of plug members 34, with the primary air feeding sections 14, 16, respectively. Each of the primary feeding sections 14, 16 includes the primary main pulse gas feeder 54 and a primary auxiliary pulse gas feeder 55. The primary main pulse gas stream and the primary auxiliary pulse gas stream are pulse air streams. As a gas stream generator, a compressor may be employed. The primary main pulse gas stream is introduced into the through holes 33 of the primary filter 2, 4 from the exhaust gas outflow side in a direction reverse to the flowing direction of the exhaust gas. The primary auxiliary pulse gas stream is introduced into the through holes 33 from the primary auxiliary gas feeder 55 through a pipe line 56 and the channels 36. The flowing courses of the main pulse gas stream and the auxiliary gas stream may be the same as mentioned above. (5) The switch valves 18, 19, 20 and 21 are shut valves capable of selectively effecting switching between an exhaust gas-flowing mode (capturing mode) and a pulse air-flowing mode (back wash mode). In FIG. 1, the switch valves 20, 21 are in the exhaust gas flowing mode, whereas the switch valves 18, 19 are in the pulse air-flowing mode. As the shut valve used in the present invention, a three-way valve or other kind of a valve may be used instead of the butterfly valve.

In the right filtering tube in the state of FIG. 1, the switch valve 18 closes the exhaust gas-introducing opening 61, whereas the switch valve 19 opens the exhaust gas discharge opening 62. In the left filtering tube, the switch valve 20 opens the exhaust gas-introducing opening 61, whereas the switch valve 21 closes exhaust gas discharge opening 62. In the state of FIG. 1, the exhaust gas is discharged outside through the exhaust gas-introducing opening 61 with the switch valve 20 and the primary filter 4. The main pulse air and the auxiliary pulse air are fed from a primary main pulsating feeding section 54 and a primary auxiliary pulse feeding source section 55, and led to the treating unit 26 through the primary filter 26, the pulse air discharge opening (exhaust gas discharge opening) 62 and the pipe line 10.

The pulse air may be flowed through the pipe lines 10, 12 by appropriately switching the switch valves 18, 19, 20, 21, and the pulse air and the particulates are flowed to feed the particulates to the treating unit 26 together with pulse air. (6) The secondary air feeding section 24 may be a compressor or the like to feed a pulse air to the secondary filter 6. When the air-escape switching valve 63 is closed and the pulse gas stream is fed through the secondary air feeder 24, the captured particulates captured by the secondary filter 60 are blown out from the through holes 33, and fall in a vessel 27 for the treating vessel. (7) Since the treating unit 26 is provided at the remote location outside the exhaust system. In the treating unit 26, the particulates captured by the secondary filter 6 are blown down, and burnt with the heater 64. The combustion gas obtained by burning the particulates is discharged outside through the secondary filter 6 and the air escape switch valve 63.

Figure 11:
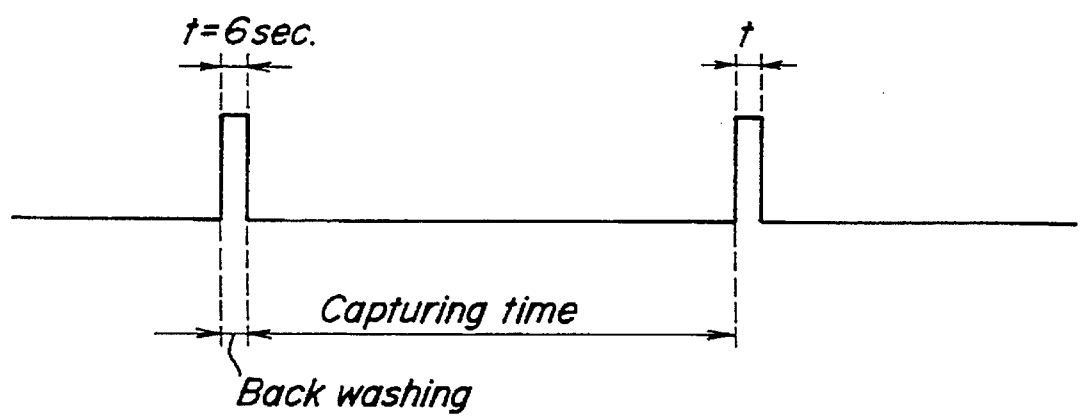
FIG. 11 is a time chart diagram showing a particulate-capturing process and a back wash process in the first embodiment of the present invention.

Next, switching the valves between the capturing mode and the back wash mode as well as turning on and off the pulse air stream will be explained with reference to FIGS. 11 and 12.

Figures 12A, 12B, 12C:
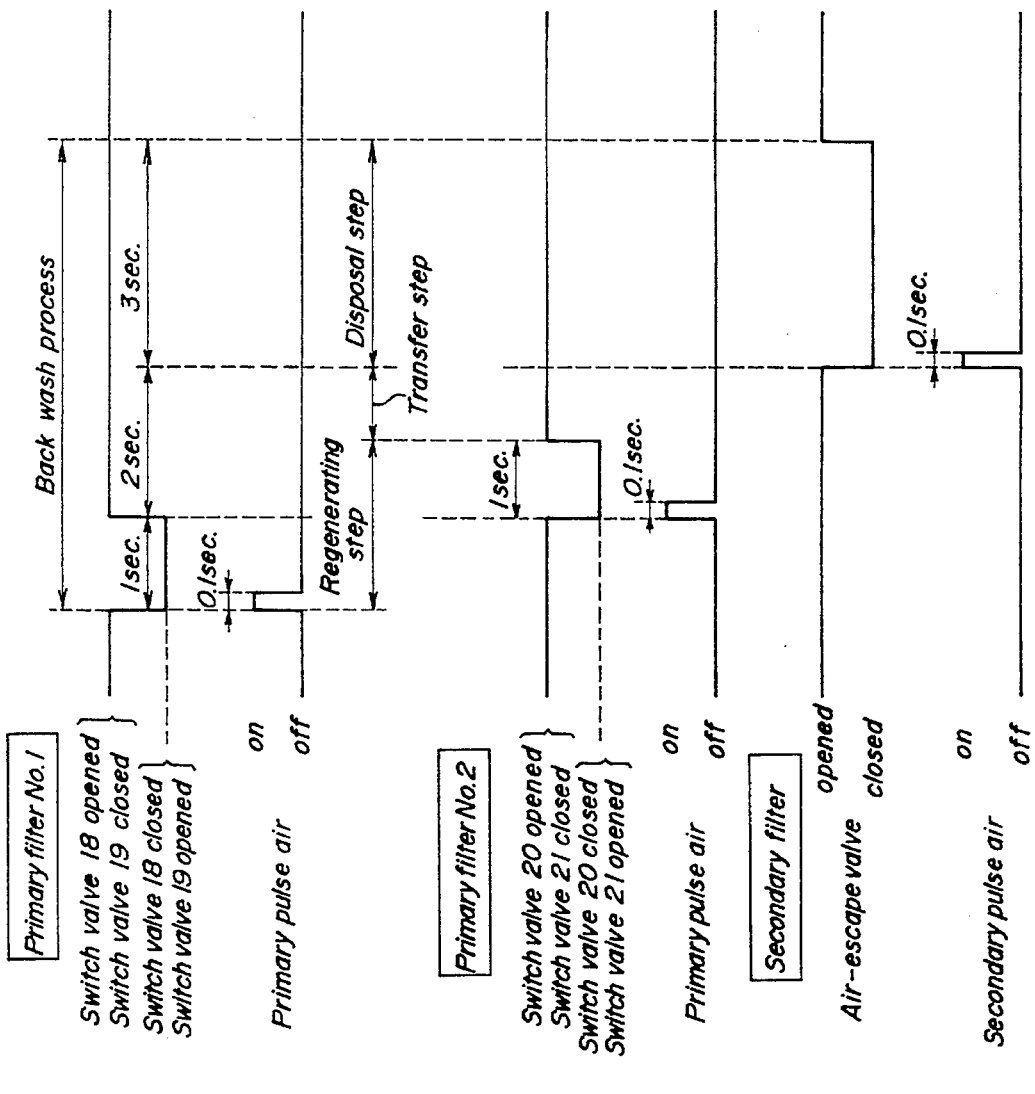
FIGS. 12(A) through 12(C) are time chart diagrams for showing timings for turning on or off a switch valve for a primary filter and a switch valve for a secondary filter during a back washing process in the first embodiment of the present invention as well as pulse airs for these filters.

During the capturing step in FIG. 1, the switch valve 18 or 20 is opened, the switch valve 19 or 21 is closed. Thereby, the particulates in the exhaust gas from the diesel engine are captured by the primary filters 2 and 4. The primary filters 2 and 4 are periodically back washed. As shown in FIG. 11, the back washing for 6 seconds and the capturing process for 2 minutes and 54 seconds are alternatively repeated. In the exhaust gas-treating step, the operations of the switch valves 18 and 20 and the air-escape switch valve 63 are set as shown in FIGS. 12(A) through 12(C). The exhaust gas-treating process includes (A) a regenerating step, (B) a transferring step, and (C) a disposal step.

(A) Regenerating Step

In the regenerating step, the switch valve 18 is switched to "closed" and the switch valve 19 is to "opened" and this state is kept for 1 second The primary pulse air stream is flown for 0.1 seconds simultaneously with the switching the valves 18 and 19. After the regeneration of the primary filter 2 (No. 1), a similar operation is effected with respect to the primary filter 4 (No. 2). That is, in the primary filter No. 2, the switch valve 20 is switched to "closed" and the switch valve 21 is switched to "opened", and this state is kept for 1 second. The primary pulse air stream is turned on, i.e., flowed for 0.1 seconds simultaneously with the above switching. Thereby, the regenerating step for the primary filter 2 (No. 1) and the primary filter 4 (No. 2) are terminated. Thereafter, with respect to the primary filters 2 (No. 1) and 4 (No. 2), their operation to capture the particulates in the exhaust gas is performed.

(B) Transferring Step

The transferring step is a step from the termination of the regenerating step to a point of time when the transferring the particulates carried with the primary pulse air stream to the vessel 27 of the treating device 26 through the pipe lines 10, 12 is terminated. In this embodiment, the particulates are transferred at one time to the vessel 27 at the remote location under the feed pressure from the primary pulse air feeding section through the pipe lines 10, 12. As the particulate-transferring means, the pulse air stream only is used, but no other transferring means is used. As the pulse air stream, high speed air stream or high pressure air stream may be used. For example, the flow rate or the pressure of air is appropriately set at the outlet of the honeycomb filter.

(C) Disposal Process

When the particulates are captured by the secondary filter 6, the air-escape switch valve 63 is switched from the "open" state to the "closed" state. Simultaneously with this, the secondary pulse air stream is blown into the treating vessel through the secondary filter 6 in a reverse direction. Consequently, the captured particulates in the secondary filter 6 are dropped inside the vessel 27 of the treating device 26. The secondary pulse air stream is turned on, i.e., flowed for 0.1 seconds. On the other hand, the time period during which the air-escape switch valve 63 is in the "closed" state is about 3 seconds. The particulates dropped in the bottom of the vessel 27 are burnt by the electric heater 64. The combustion gas is discharged outside from the vessel 27 through the secondary filter 6 and the air-escape switch valve 60. Thereby, the particulate disposal step is terminated.

The exhaust gas-treating process composed of the regenerating step, the transferring step and the disposal process is terminated in about 6 seconds in this case. The exhaust gas-treating process is periodically carried out in the capturing process with the primary filter 2 (No. 1) and the primary filter 4 (No. 2) every 3 minute interval.

In the above first embodiment, the primary filters 2 and 4, the switch valves 18 and 19, and the switch valves 20 and 21 are subjected to switching at a time lag of about 1 second. The invention is not limited to such a time lag. For example, every time one primary filter is regenerated, the regenerating step may be effected once with the secondary pulse air stream. Further, the back wash process may be effected non-periodically.

Next, the pressure loss in the exhaust gas-treating apparatus will be explained based on experimental results through comparison between the above first embodiment and conventional comparison examples.

(Experiment 1)

Comparison Example 1 compared with the above first embodiment is a case where a secondary filter (recapturing section) was provided immediately under a primary filter.

In Experiment 1, the pressure loss of the exhaust gas-treating apparatus was examined. In Comparison Example 1, experiment was effected under the same condition as that of the first embodiment except for the arrangement of the secondary filter. Experimental results are shown in FIG. 13. As shown in FIG. 13, as compared with Comparative Example 1, the first embodiment had a smaller pressure loss. This is considered to mean that although the back wash step for the primary filter was not completely terminated due to flying up of the particulates such as soot, the capturing step was started. In the above first embodiment, since the secondary filter is arranged outside the exhaust line, the capturing step is started assuredly after the back step is completely terminated. (Experiments 2)

Comparative Example 2 is a case where honeycomb filters sealed in a checkered pattern were used as the primary filters. Meanwhile, according to the first embodiment, the through holes were sealed along the rows at opposite ends and the lateral holes are bored in the peripheral side, and the auxiliary pulse air was blown through the channels from the lateral holes.

In Experiment 2, the pressure loss of the exhaust gas-treating apparatus was examined. Comparison Example 2 was examined under the same condition as in the above first embodiment except for the structure of the primary filters and the feeding of the auxiliary pulse air stream. Experimental results are shown in FIG. 14. As shown in FIG. 14, the pressure loss increased with the lapse of time in the case of the exhaust gas-treating apparatus of Comparison Example 2. This is presumed to be caused by the phenomenon that the clogged degree of the particulates such as soot gradually increased in Comparative Example 2. To the contrary, in the above first embodiment, the pressure loss is suppressed to a low level. This is considered to be caused by the phenomenon that since the secondary filter is arranged outside the exhaust line, the primary filter is sufficiently regenerated by the back washing step.

Figure 15:
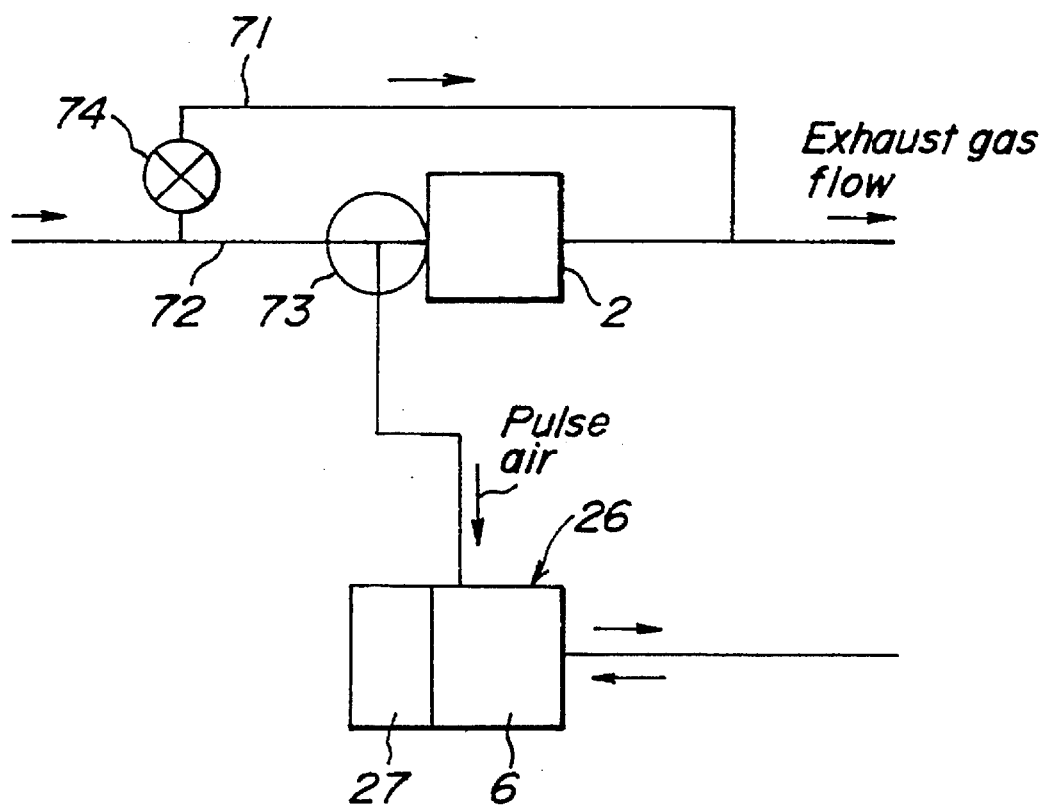
FIG. 15 is a circuit diagram illustrating flows of exhaust gases and pulse air in a third embodiment of the present invention.

Next, a third embodiment is shown in FIG. 15.

With respect to this second embodiment, the capturing step and the back wash step are effected with use of one primary filter only. That is, the third embodiment is a case where a bypass passage 71 is provided to bypass a primary filter 2 with the switch valves 18 and 19 being omitted. That is, the exhaust gas passes the passage 72 during the capturing step, and the exhaust gas is flowed through the bypass passage 71 during the regenerating step in the exhaust gas-treating process. The above switching operation is effected by switching the switch valves 73 and 74.

In this second embodiment, since only one primary filter needs to be provided, the construction is simple and the production cost can be reduced. Since the exhaust gas is discharged outside through the bypass passage 71 during the regenerating step, the particulates in the exhaust gas are not captured. However, as compared with the time period during which the particulates are captured, the regenerating time period in the back washing step is extremely short. Therefore, that the particulates in the exhaust gas cannot be captured during the regenerating step does pose almost no problem.

As mentioned above, according to the process and the apparatus for treating the exhaust gases, the particulates captured by the primary filter or filters are transferred to the treating device at the location remote from the primary filter outside the exhaust line, and then disposed of. Accordingly, the clogging of the first filter due to blowing-back of the particulates can be prevented, and the primary filter can be appropriately regenerated. Further, the particulates can be largely removed from the exhaust gases.

Next, a first process for producing the exhaust gas filter as shown in FIGS. 3 through 5 will be explained by referring to FIGS. 16 and 17.

Now, a process for forming a first sealed portion of the exhaust gas filter will be explained with reference to the following steps (1) through (5). (1) As shown in FIG. 16(A), sealed portions 80 are formed at a depth of about 5 mm at end portions of all the gas flow holes on the exhaust gas outflow side. (2) After drying, as shown in FIG. 16(B), the sealed portions 34 are removed in the alternative rows by means of a saw or the like, thereby forming channels 81 and 82 at a depth of about 30 mm. (3) As shown in FIG. 16(C), a packing 83 is packed at an entire bottom of each of thus formed channels 81 and 82 in a thickness of about 10 mm. (4) As shown in FIG. 16(D), the channels 81 and 83 sealed, excluding the packing 83. (5) The exhaust gas filter-producing product is dried, and fired after removing the packing. After the firing, as shown in FIG. 16(E), the end portion of the product is cut such that none of the sealed portions 80 in the rows in which no packing 83 was filled are left. Thereby, the first sealed portions 34 are formed along given rows, and auxiliary gas stream-introducing holes 36 are formed immediately under the sealed portions 34.

Figure 17A:
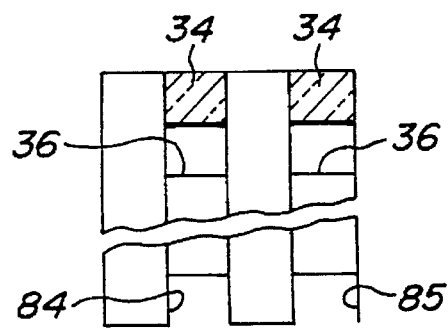
FIGS. 17(a) through 17(c) are views for schematically illustrating an example of the process for producing a second sealed section of the second embodiment of the present invention.
Figure 17B:
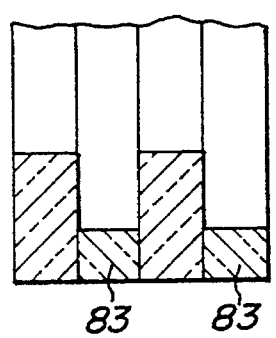
Figure 17C:
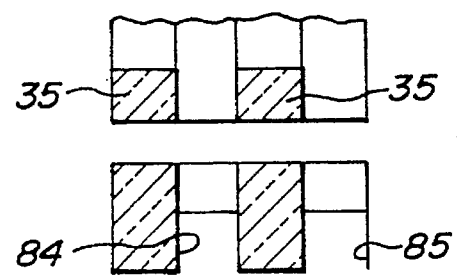

A process for forming the second sealed portion will be illustrated by the following steps (1) through (3). (1) As shown in FIG. 17(A), channels 84 and 85 are formed in a thickness of about 5 mm in the holes in the rows in which the first sealed portions 34 are formed. (2) As shown in FIG. 17(B), the packing 83 is packed into the channels 84 and 85, the through holes in the rows in which no packing 83 is filled are sealed. (3) The exhaust gas filter-forming product is dried, and fired after removing the packing. After the firing, as shown in FIG. 17(C), an end portion of the product is cut such that the channels 84 or 85 are not left.

Next, a second process for producing the exhaust gas filter will be explained with reference to FIGS. 18(A) through 18(C) and 19.

Figure 18A:
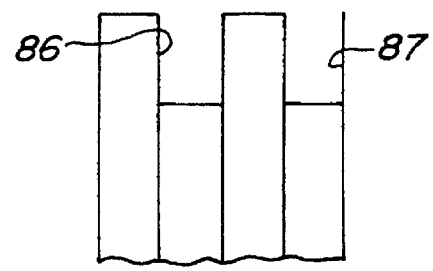
FIGS. 18(a) through 18(d) are views for schematically illustrating another example of the process for producing a first sealed section of the second embodiment of the present invention.
Figure 18B:
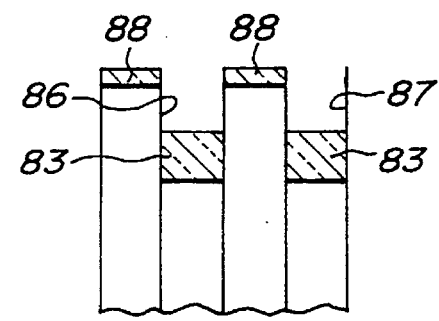
Figure 18C:
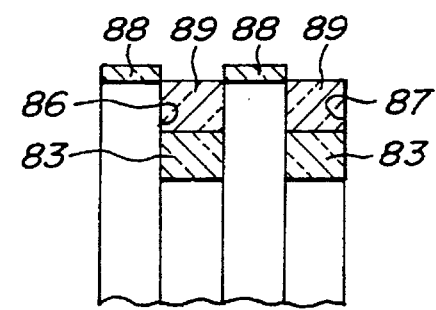
Figure 18D:
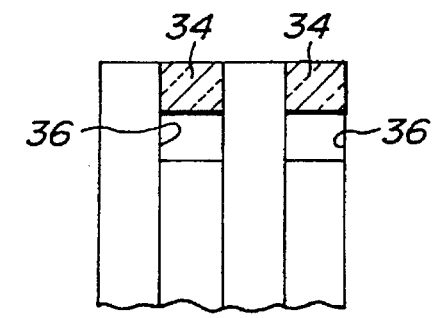

A process for forming first sealed portions and auxiliary gas stream-introducing channels will be explained based on the following steps (1) through (4). (1) As shown in FIG. 18(A), channels 86 and 87 are formed in the gas flow holes in alternative rows. (2) As shown in FIG. 18(B), a packing 83 is filled into a bottom portion of each of the thus formed channels 86 and 87 such that a space for the formation of a first sealed portion may be left in an upper portion of each of the channels 86 and 87. An end face of the exhaust gas filter is covered with a masking plate 88 having a contour shape almost identical with a cross sectional plane shape of the exhaust gas filter. Then, the peripheral portion of the masking plate is fixed to the exhaust gas filter by taping. The masking plate 88 is so integrally formed that the gas flow holes formed with no channels 86 or 87 are covered with a planar cover plates along rows, and the gas flow holes with the channels 86 or 87 are not covered therewith. (3) As shown in FIG. 18(C), the remaining space portions of the channels 86 and 87 packed with the packing are sealed at 89. (4) After drying the exhaust gas filter-forming product, as shown in FIG. 18(D), the packing 83 and the masking plate 88 are removed. Thereby, the auxiliary gas stream-introducing holes 36 are formed immediately under the first sealed portions 34. Firing is effected after second sealed portions are formed as mentioned below.

Figure 19A:
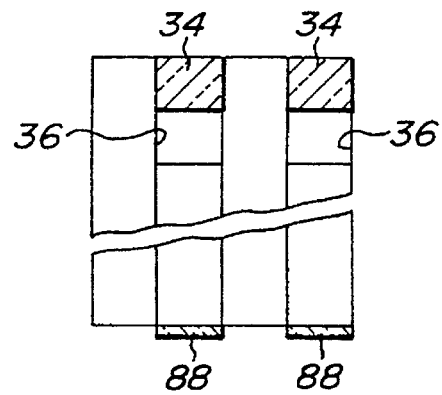
FIGS. 19(a) through 19(c) are views for schematically illustrating another example of the process for producing a first sealed section of the second embodiment of the present invention.
Figure 19B:
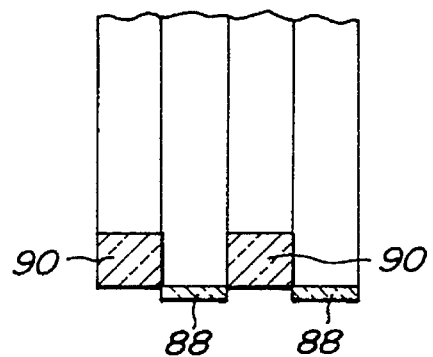
Figure 19C:
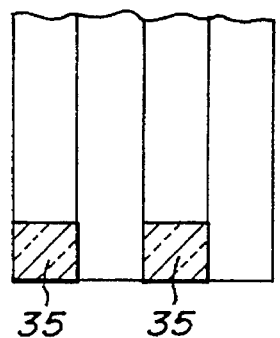

An another process for the formation of second sealed portions will be explained based on the following steps (1) through (3). (1) As shown in FIG. 19(A), ends of the gas flow holes on a side opposite to a side on which the first sealed portions 34 are formed are covered with a masking plate 88 in the same rows. (2) As shown in FIG. 19(B), the gas flow holes not covered with the masking plate 88 are sealed at 90. (3) As shown in FIG. 19(C), the masking plate 88 is removed, and the exhaust gas filter-producing product is fired after drying. Thereby, the second sealed portions 35 are formed.

In the second embodiment of FIGS. 3 through 5, an exhaust gas filter may be produced by boring auxiliary gas stream-introducing channel having a round shape through peripheral wall of a honeycomb structural body, immediately under the first sealed portions in the same rows by means of a drill or the like.

In this second embodiment, the auxiliary gas stream-introducing channels are formed, near and upstream the first sealed portions, penetrating the inner walls and the outer peripheral wall, and the auxiliary pulse gas stream is ejected into the auxiliary gas stream-introducing channels. By so doing, the particulates contained in the exhaust gas and captured and heaped onto the inner walls of the gas flow holes near the first sealed portions can be peeled during back washing to excellently remove the particulates captured by the exhaust gas filter. Thereby, the exhaust gas filter is so regenerated as to reduce the pressure loss of the exhaust gas through the filter. Further, since the peeled particulates are transferred under the ejecting pressure of the gas stream to the remote capturing tube where the particulates are burnt, the peeled particulates can be prevented from returning to the exhaust gas filter.

An exhaust gas filter as a third embodiment of the present invention is shown in FIG. 20.

In this embodiment, first sealed portions 91 and second sealed portions 92 project outwardly at 91a, 92a from end portions of inner walls in a longitudinal direction of gas flow holes 33.

When the main pulse gas stream flows in, the main pulse gas stream is rectified by projected portions 91a of the first sealed portions 91 having a triangular section, so that the main pulse gas stream can be blown into the gas flow holes 33 without impinging upon or being reflected by the first sealed portions 91. Accordingly, turbulence of the main pulse gas stream can be reduced when the main pulse gas stream is blown into the exhaust gas filter 301.

When the main pulse gas stream and the auxiliary pulse gas stream are discharged through the gas flow pipes, the combined stream is discharged and dispersed along surfaces of the projected portions 92a of the second sealed portions 92. Thus, the peeled particulates are prevented from being bridged near gas stream outlets of the gas flow holes 33.

The projected portions of the sealed portions in the fourth embodiment may take any shape, so long as the entering gases are rectified and the peeled particulates are prevented from being bridged near the gas stream outflow openings of the gas flow holes.

The construction, function and effects of the fourth embodiment other than those discussed above are the same as stated in connection with the first embodiment, their explanation will be omitted. A process for the production of the fourth embodiment is the same as that of the second embodiment of FIGS. 1–3 except that the sealed portions are cut to meet the projected portions.

An exhaust gas filter as a fifth embodiment according to the present invention will be illustrated in FIG. 21.

An exhaust gas filter 302 is constituted by a quadrangular prismatic honeycomb structural body. First sealed portions 341 are formed in L-shaped rows at a downstream end portion as viewed in a flowing direction of the exhaust gas. Auxiliary gas stream-introducing channels 361 are formed, near the first sealed portions 341 of the gas flow holes 331, penetrating the exhaust gas filter along almost L-shaped rows, by removing inner walls 311 in the rows at which the first sealed portions 341 are formed as well as an outer peripheral wall 321 are formed. Second sealed portions (not shown) are formed in almost L-shaped rows at an upstream end portion of the exhaust gas filter 302 which rows are not formed with the first sealed portions.

The main pulse stream generated by the compressor 54 enters the exhaust gas filter 302 through the exhaust gas flow holes 331 with no first sealed portions 341, passes fine pores of the inner walls 311, and enters the gas flow holes 331 formed with the first sealed portions 341. The main pulse gas stream flowing in peels the particulates heaped on the inner walls 311, and the peeled particulates are transferred to a recapturing tube not shown.

An auxiliary pulse gas stream generated by a compressor 55 is ejected into the auxiliary pulse gas stream-introducing holes 331, and peels the particulates heaped near the first sealed portions 341 from the inner walls 331. When the auxiliary pulse gas stream hits the inner walls 331 at a corner of the L-shaped auxiliary pulse gas stream-introducing channel 361, a part of the auxiliary pulse gas stream changes its flow direction at right angles, and the remaining flow is disturbed. For example, the auxiliary pulse gas stream changes its flow direction in an upstream direction to peel the particulates heaped on the inner walls 311.

In the above-illustrated embodiments, the exhaust gas filters are made of porous cordierite. However, according to the present invention, the exhaust gas filter may be produced by using other ceramic such as DHC-221 raw material type, mullite, alumina or silica.

Further, according to the above embodiments, although the auxiliary pulse gas stream-introducing channels are formed by removing the outer peripheral wall of the honeycomb structural body at opposite ends. According to the present invention, as mentioned before, the auxiliary pulse gas stream-introducing channels may be formed by removing the outer peripheral wall of the honeycomb structural body at one end thereof. Further, according to the embodiments of the invention, the exhaust gas filters are shaped in a cylindrical form or a quadrangular primastic form, and the rows along which the first or second sealed portions are formed are linear or almost L-shaped. The shapes of the exhaust gas filters and the first and second sealed portions are not limited to the above-mentioned ones.

According to the exhaust gas filters of the present invention, the filter is constituted by the honeycomb structural body, and the first sealed portions are formed in the gas flow holes in given rows on the downstream side of the exhaust gas, while the second sealed portions are formed in the gas flow holes on the upstream side of the exhaust gas in the remaining rows. Further, the auxiliary pulse gas stream-introducing channels are formed, penetrating the outer peripheral wall at at least one of opposite ends of the channels near and upstream the first sealed portions in the rows. Accordingly, the main pulse gas stream is ejected into the gas flow holes, and the auxiliary pulse gas stream is ejected into the auxiliary gas stream-introducing channels. Thereby, the particulates contained in the exhaust gas and composed mainly of carbon are captured in the exhaust gas filter, and can be effectively removed. Thus, the pressure loss of the regenerated exhaust gas is reduced.

What is claimed is:

1. An exhaust gas honeycomb filter comprising a honeycomb structural body having an outer peripheral wall and inner walls forming a number of gas flow holes through which an exhaust gas passes along a flow direction; first sealed portions sealing exhaust gas-downstream ends of the gas flow holes that are located in given first rows; second sealed portions sealing exhaust gas-upstream ends of the remaining gas flow holes that are located in remaining second rows; and gas stream-introducing channels each provided near and upstream of said first sealed portions, wherein said gas stream-introducing channels penetrate the outer peripheral wall of the honeycomb structural body and extend through inner walls along the first rows.

2. The exhaust gas honeycomb filter set forth in claim 1, further including a first gas stream generator for generating a gas stream to flow into the honeycomb structural body opposite the flow direction of the exhaust gas; and a second gas stream generator for generating a gas stream to flow into the gas stream-introducing channels through the outer peripheral wall of the honeycomb structural body.

3. The exhaust gas honeycomb filter set forth in claim 1, wherein said first sealed portions and said second sealed portions project outwardly from respective ends of the honeycomb structural body along a longitudinal direction of the honeycomb structural body such that gas entering and exiting the filter flows along surfaces of the first sealed portions and the second sealed portions.

4. The exhaust gas honeycomb filter set forth in claim 2, wherein said first sealed portions and said second sealed portions project outwardly from respective ends of the honeycomb structural body along a longitudinal direction of the honeycomb structural body such that gas entering and exiting the filter flows along surfaces of the first sealed portions and the second sealed portions.

5. The exhaust gas honeycomb filter set forth in claim 3, wherein a portion of each of said first sealed portions and said second sealed portions that projects outwardly has a triangular cross-section.

6. The exhaust gas honeycomb filter set forth in claim 4, wherein a portion of each of said first sealed portions and said second sealed portions that projects outwardly has a triangular cross-section.

7. An exhaust gas-treating process comprising the steps of:

(1) capturing particulates contained in an exhaust gas from an internal combustion engine by passing the exhaust gas along an exhaust line and through a primary honeycomb filter provided in the exhaust line;

(2) stopping flow of the exhaust gas through the primary filter and transferring the captured particulates to a secondary honeycomb filter positioned remote from and outside the exhaust line by flowing the particulates captured by the primary filter in a direction reverse to a flow direction of the exhaust gas;

(3) introducing a backwash gas flow into the secondary filter to remove the captured particulates in the secondary filter and to transfer the captured particulates to a heater spaced apart from the secondary filter; and (4) operating the heater to burn the particulates and discharging burnt matter.

8. The exhaust gas-treating process set forth in claim 7, wherein the second through fourth steps (2)–(3) are carried out non-periodically during operating the internal combustion engine.

9. The exhaust gas-treating process set forth in claim 7, wherein the second and third steps (2) and (3) are carried out non-periodically during operating the internal combustion engine.

10. The exhaust gas-treating process set forth in claim 7, wherein first and second primary filters are provided, the first and second primary filters being alternatively subjected to step (1) and to steps (2)–(4), respectively.

11. An exhaust gas-treating process comprising the steps of:

(1) providing an exhaust gas honeycomb filter having a honeycomb structural body which includes an outer peripheral wall and inner walls forming a number of gas flow holes through which an exhaust gas passes along a flow direction; first sealed portions sealing exhaust gas-downstream ends of the gas flow holes that are located in given first rows; second sealed portions sealing exhaust gas-upstream ends of the remaining gas flow holes that are located in remaining second rows; and gas stream-introducing channels each provided near and upstream of said first sealed portions, wherein said gas stream-introducing channels penetrate the outer peripheral wall of the honeycomb structural body and extend through inner walls along the first rows;

(2) capturing particulates contained in an exhaust gas by passing the exhaust gas along an exhaust line and through the honeycomb filter provided in the exhaust line;

(3) stopping flow of the exhaust gas through the filter and transferring the captured particulates to a location remote from and outside the exhaust line by introducing a gas through the gas stream-introducing channels and flowing the introduced gas in a direction reverse to the flow direction of the exhaust gas; and (4) burning the particulates and discharging burnt matter.

12. The exhaust gas-treating process set forth in claim 11, wherein steps (3) and (4) are carried out periodically during operation of the internal combustion engine.

13. The exhaust gas-treating process set forth in claim 11, wherein steps (3) and (4) are carried out non-periodically during operation of the internal combustion engine.

14. The exhaust gas-treating process set forth in claim 11, wherein first and second honeycomb filters are employed, the first and second honeycomb filters being alternatively subjected to step (2) and to steps (3)–(4), respectively.

15. An exhaust gas-treating process comprising the steps of:
(1) capturing particulates contained in an exhaust gas from an internal combustion engine by flowing the exhaust gas along an exhaust line and through a primary honeycomb filter provided in the exhaust gas line;
(2) removing the captured particulates from the primary filter and regenerating the primary filter by flowing air through the primary filter in a direction reverse to a flow direction of the exhaust gas;
(3) transferring the captured particulates to a secondary honeycomb filter remote from and outside an exhaust line by flow of said air;
(4) introducing a backwash gas flow into the secondary filter to remove the captured particulates in the secondary filter and to transfer the captured particulates to a heater spaced apart from the secondary filter; and
(5) operating the heater to burn the particulates and discharging burnt matter.

16. The exhaust gas-treating process set forth in claim 15, wherein the second through fifth steps (2)–(5) are carried out periodically during operating the internal combustion engine.

17. The exhaust gas-treating process set forth in claim 15, wherein the second through fifth steps (2)–(5) are carried out non-periodically during operating the internal combustion engine.

18. The exhaust gas-treating process set forth in claim 15, wherein first and second primary filters are provided, the first and second primary filters being alternately subjected to step (1) and to steps (2)–(5), respectively.

19. An exhaust gas-treating process comprising the steps of:
(1) providing an exhaust gas honeycomb filter having a honeycomb structural body which includes an outer peripheral wall and inner walls forming a number of gas flow holes through which an exhaust gas passes along a flow direction; first sealed portions sealing exhaust gas-downstream ends of the gas flow holes that are located in given first rows; second sealed portions sealing exhaust gas-upstream ends of the remaining gas flow holes that are located in remaining second rows; and gas stream-introducing channels each provided near and upstream of said first sealed portions, wherein said gas stream-introducing channels penetrate the outer peripheral wall of the honeycomb structural body and extend through inner walls along the first rows;
(2) capturing particulates contained in an exhaust gas by flowing the exhaust gas along an exhaust gas line and through said honeycomb filter provided in the exhaust gas line;
(3) removing the captured particulates from the filter and regenerating the filter by flowing air into the gas stream-introducing channels and through the filter in a direction reverse to the flow direction of the exhaust gas;
(4) transferring the captured particulates to a location remote from and outside the exhaust line by flow of said air; and
(5) burning the particulates at said remote location and discharging burnt matter.

20. The exhaust gas-treating process set forth in claim 19, wherein steps (3) and (4) are carried out periodically during operation of the internal combustion engine.

21. The exhaust gas-treating process set forth in claim 19, wherein steps (3) and (4) are carried out non-periodically during operation of the internal combustion engine.

22. The exhaust gas-treating process set forth in claim 19, wherein first and second honeycomb filters are employed, the first and second honeycomb filters being alternatively subjected to step (2) and to steps (3)–(4), respectively.

23. An exhaust gas-treating apparatus for capturing and disposing of fine particulates discharged from an internal combustion engine, comprising:
a primary honeycomb filter provided in a main exhaust line, for capturing particulates in an exhaust gas flowing therethrough;
an auxiliary line interconnecting the primary honeycomb filter to a secondary honeycomb filter;
a valve structure for selectively opening and closing the main exhaust line and the auxiliary line to the primary honeycomb filter;
a primary air feeder for flowing air to the primary honeycomb filter opposite an exhaust gas flow direction, to blow the captured particulates to the secondary honeycomb filter through the auxiliary line;
a secondary air feeder for introducing a backwash air flow to the secondary honeycomb filter; and
a vessel including a heater to receive backwashed particulates from the secondary honeycomb filter, said heater being adapted to burn the backwashed particulates.

24. An exhaust gas-treating apparatus for capturing and disposing of fine particulates discharged from an internal combustion engine, comprising:
a primary filter provided in an exhaust gas line, for capturing particulates in an exhaust gas flowing therethrough, said primary filter comprising a honeycomb structural body having an outer peripheral wall and inner walls forming a number of gas flow holes through which an exhaust gas passes along a flow direction; first sealed portions sealing exhaust gas-downstream ends of the gas flow holes that are located in given first rows; second sealed portions sealing exhaust gas-upstream ends of the remaining gas flow holes that are located in remaining second rows; and gas stream-introducing channels each provided near and upstream of said first sealed portions, wherein said gas stream-introducing channels penetrate the outer peripheral wall of the honeycomb structural body and extend through inner walls along the first rows;
an auxiliary line interconnecting the primary filter to a burning unit;
a valve structure for selectively opening and closing the main exhaust gas line and the auxiliary line to the primary filter; and
a primary air feeder for flowing air through the exhaust gas channels and opposite an exhaust gas flow direction, to blow the captured particulates to the burning unit through the auxiliary line.

25. The exhaust gas-treating apparatus of claim 24, further comprising a secondary filter and a secondary air feeder for introducing a backwash air flow to the secondary filter, wherein said burning unit receives backwashed particles from the secondary filter.

* * * * *